United States Patent
Qu et al.

(10) Patent No.: US 10,312,990 B2
(45) Date of Patent: Jun. 4, 2019

(54) SIGNAL SENDING OR RECEIVING METHOD AND DEVICE

(71) Applicant: Huawei Technologies Co., Ltd., Shenzhen, Guangdong (CN)

(72) Inventors: Bingyu Qu, Beijing (CN); Jianqin Liu, Beijing (CN); Kunpeng Liu, Beijing (CN); Yongxing Zhou, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/909,732

(22) Filed: Mar. 1, 2018

(65) Prior Publication Data

US 2018/0191423 A1 Jul. 5, 2018

Related U.S. Application Data

(63) Continuation of application No. PCT/CN2015/088850, filed on Sep. 2, 2015.

(51) Int. Cl.
*H04B 7/12* (2006.01)
*H04B 7/06* (2006.01)
(Continued)

(52) U.S. Cl.
CPC ............. *H04B 7/12* (2013.01); *H04B 7/0684* (2013.01); *H04B 7/26* (2013.01); *H04L 27/2614* (2013.01);
(Continued)

(58) Field of Classification Search
CPC .......... H04B 7/12; H04B 7/0684; H04B 7/26; H04L 27/3411; H04L 27/2621;
(Continued)

(56) References Cited

U.S. PATENT DOCUMENTS

2004/0136464 A1* 7/2004 Suh .................. H04L 1/0618
375/260
2008/0273522 A1* 11/2008 Luo .................. H04J 11/0076
370/350
(Continued)

FOREIGN PATENT DOCUMENTS

CN 101064546 A 10/2007
CN 101136888 A 3/2008
(Continued)

OTHER PUBLICATIONS

Fumihiro Hasegawa et al., "A Novel PAPR Reduction Scheme for SC-OFDM with Frequency Domain Multiplexed Pilots", IEEE Communications Letters, vol. 16, No. 9, Sep. 1, 2012, 4 pages, XP011461856.
(Continued)

*Primary Examiner* — Kenneth T Lam

(57) ABSTRACT

A signal sending method includes: mapping, by a sending device, a first sequence onto M even-numbered subcarriers in 2M subcarriers, and mapping a second sequence onto M odd-numbered subcarriers in the 2M subcarriers, where the first sequence is one of a third sequence and a fourth sequence, the second sequence is the other of the third sequence and the fourth sequence, the 2M subcarriers are subcarriers on a same time domain symbol, and for elements of a second time domain sequence corresponding to the fourth sequence and a first time domain sequence corresponding to the third sequence at a same moment, when a complex factor is taken out, one of the first time domain sequence and the second time domain sequence is an in-phase component, and the other is a quadrature component; and transforming sequences mapped onto the 2M subcarriers to a time domain to generate transmit signals, and then sending the transmit signals.

20 Claims, 6 Drawing Sheets

(51) Int. Cl.
  *H04B 7/26* (2006.01)
  *H04L 27/26* (2006.01)
  *H04L 27/34* (2006.01)
  *H04L 5/00* (2006.01)

(52) U.S. Cl.
  CPC ...... *H04L 27/2621* (2013.01); *H04L 27/3411* (2013.01); *H04L 5/0048* (2013.01); *H04L 5/0053* (2013.01); *H04L 27/2636* (2013.01)

(58) Field of Classification Search
  CPC . H04L 27/2614; H04L 5/0053; H04L 5/0048; H04L 27/2636
  See application file for complete search history.

(56) References Cited

U.S. PATENT DOCUMENTS

| | | |
|---|---|---|
| 2008/0279292 A1 | 11/2008 | Tanabe et al. |
| 2010/0080312 A1* | 4/2010 | Moffatt .................. H04B 1/713 375/260 |
| 2010/0110873 A1* | 5/2010 | Han .................... H04J 13/0062 370/208 |
| 2010/0303126 A1 | 12/2010 | Wu et al. |
| 2012/0201314 A1 | 8/2012 | Park et al. |
| 2016/0198414 A1 | 7/2016 | Yano et al. |
| 2017/0078998 A1* | 3/2017 | Li ........................ H04W 56/00 |
| 2018/0048387 A1* | 2/2018 | Zong .................... H04B 10/112 |
| 2018/0103475 A1* | 4/2018 | Qu ........................ H04W 72/04 |

FOREIGN PATENT DOCUMENTS

| | | |
|---|---|---|
| JP | 2005033310 A | 2/2005 |
| JP | 2008283288 A | 11/2008 |
| WO | 2015/059834 A1 | 4/2015 |

OTHER PUBLICATIONS

Li Lei et al., "A Method for PAPR Reduction Using Pilot Sequences in SC-FDMA", Sep. 23, 2010, 6 pages, XP031827875.

Takeo Yamasaki et al., "Scattered Pilot Assisted Channel Estimation for IFDMA Uplink", IEICE Trans. Commun., vol. E92-B, No. 12 Dec. 1, 2009, 12 pages, XP001552449.

Min et al.; "Low Complexity PAPR Reduction in OFDM Based on Orthogonal Projection"; Journal of Nanjing University of Aeronautics & Astronautics, vol. 37, No. 1; Feb. 2005; 4 pages.

Wenling Bai et al, "Improved single-carrier frequency domain equalization systems", 2009 7th International Conference on Information, Communications and Signal Processing, Jan. 2010, 5 pages.

* cited by examiner

SIGNAL SENDING OR RECEIVING METHOD AND DEVICE

CROSS-REFERENCE TO RELATED APPLICATION

This application is a continuation of International Application No. PCT/CN2015/088850, filed on Sep. 2, 2015, the disclosure of which is hereby incorporated by reference in its entirety.

TECHNICAL FIELD

The present application relates to the field of communications systems, and in particular, to a signal sending or receiving method and apparatus.

BACKGROUND

Modern communications systems (for example, a Global System for Mobile Communications (GSM), Code Division Multiple Access 2000 (CDMA2000), a Wideband Code Division Multiple Access (WCDMA) system, and a 3rd Generation Partnership Project (3GPP) Long Term Evolution (LTE) system) generally operate on a carrier lower than 3 GHz. With emergence of intelligent terminals, particularly video services, current spectrum resources can hardly meet explosive growth of a capacity requirement of a user. A high frequency band with a higher available bandwidth, particularly a millimeter-wave band, is increasingly becoming a candidate frequency band of a next generation communications system. For example, a potential available bandwidth of a carrier in a range from 3 GHz to 200 GHz is approximately 250 GHz. Therefore, in a future communications system, a high-efficiency signal sending method, for example, a sending method with a low peak-to-average ratio, needs to be taken into consideration, to reduce a requirement for a transmitter.

An orthogonal frequency division multiplexing (OFDM) technology is generally used for downlink signal transmission in a current LTE system. With features such as a strong anti-multipath interference capability, simple implementation of a discrete Fourier transform, and being favorable to a multi-antenna transmission technology, the OFDM technology is extensively studied and applied. A discrete Fourier transform-spread-OFDM (DFT-S-OFDM) solution is used for uplink signal transmission. Peak-to-average ratio performance of a DFT-spread-OFDM signal is close to that of a single carrier signal. When subcarrier groups occupied by different user equipment do not overlap, orthogonal frequency division multiplexing can be implemented, so as to obtain a single carrier orthogonal frequency division multiple access solution.

Single carrier frequency division multiple access (SC-FDMA) transmission that is based on DFT-S-OFDM and defined in the current LTE means that a time domain signal envelope before a DFT transform is performed meets a single carrier characteristic or has a relatively good peak-to-average ratio characteristic (or a relatively good cubic metric (CM) characteristic), so that a relatively low peak-to-average ratio of a transmit signal can be obtained. In a frequency domain, the SC-FDMA transmission can be implemented in a centralized manner or a distributed manner. In centralized SC-FDMA transmission, one transmit signal of one UE occupies a contiguous frequency spectrum in the frequency domain (that is, frequency domain subcarriers are contiguous), and occupies a part of an entire system bandwidth. In distributed SC-FDMA transmission, one transmit signal of one UE occupies multiple non-contiguous equally-spaced subcarriers in the frequency domain. Frequency division multiplexing may be performed on two channels of one user equipment or two channels of two user equipment, thereby ensuring that there is little interference between the two channels. For transmission of multiple signals or channels of one UE, to keep peak-to-average ratio performance close to that of a single carrier signal, an uplink control channel and an uplink reference signal (for example, a demodulation reference signal (DMRS)) of each terminal device are transmitted in a time division multiplexing manner, or an uplink data channel and an uplink reference signal of each user are transmitted in a time division multiplexing manner. That is, the multiple signals or channels are sent on different time domain symbols, so as to keep low peak-to-average ratio performance that is close to that of single carrier signal transmission.

However, in the prior art, there is no technical solution in which a terminal device simultaneously sends two frequency-division and orthogonal signals on one time domain symbol and can reduce a high peak-to-average ratio caused by superposition of the two signals.

SUMMARY

Embodiments of the present disclosure provide a signal sending or receiving method and device, so as to simultaneously send two frequency-division and orthogonal signals on a same time domain symbol and reduce a high peak-to-average ratio caused by superposition of the two signals.

According to a first aspect, an embodiment of the present disclosure provides a signal sending method, including:

mapping, by a sending device, a first sequence onto M even-numbered subcarriers in 2M subcarriers, and mapping a second sequence onto M odd-numbered subcarriers in the 2M subcarriers, where the first sequence is one of a third sequence and a fourth sequence, the second sequence is the other of the third sequence and the fourth sequence, the 2M subcarriers are subcarriers on a same time domain symbol, the fourth sequence is a sequence carrying M first information elements, and for elements of a second time domain sequence corresponding to the fourth sequence and a first time domain sequence corresponding to the third sequence at a same moment, when a complex factor is taken out, one of the first time domain sequence and the second time domain sequence is an in-phase component, and the other is a quadrature component;

transforming, by the sending device, sequences mapped onto the 2M subcarriers to a time domain to generate transmit signals; and sending, by the sending device, the transmit signals.

With reference to a first possible implementation of the first aspect, in a first possible implementation, the first sequence is the third sequence, and the second sequence is the fourth sequence; and before the mapping a second sequence onto M odd-numbered subcarriers in the 2M subcarriers, the method further includes:

performing, by the sending device, a first joint transform on the second time domain sequence to obtain the second sequence, where the first joint transform is a joint transform of a first phase rotation and an M×M discrete Fourier transform DFT.

In a second possible implementation of the first aspect, the first time domain sequence is a sequence obtained by performing an inverse discrete Fourier transform IDFT on the first sequence; and first phase rotations corresponding to M elements of the first time domain sequence are respectively $e^{-j \times 2t\pi/2M}$, where t=0, 1, . . . , M−1.

In a third possible implementation of the first aspect, the first sequence is the fourth sequence, the second sequence is the third sequence, the first time domain sequence is a sequence obtained by performing a second joint transform on the second sequence, the second joint transform is a joint transform of an M×M inverse discrete Fourier transform IDFT and a second phase rotation, and second phase rotations corresponding to the M elements of the first time domain sequence are respectively $e^{j \times 2t\pi/2M}$, where t=0, 1, . . . , M−1; and the mapping a first sequence onto M even-numbered subcarriers in 2M subcarriers includes: performing, by the sending device, a DFT on the second time domain sequence to obtain the fourth sequence, and mapping the fourth sequence onto the M even-numbered subcarriers.

With reference to the third possible implementation of the first aspect, in a fourth possible implementation, before the mapping, by a sending device, a first sequence onto M even-numbered subcarriers in 2M subcarriers, and mapping a second sequence onto M odd-numbered subcarriers in the 2M subcarriers, the method further includes:

obtaining, by the sending device, the first time domain sequence and the second time domain sequence; and performing, by the sending device, a first joint transform on the first time domain sequence to obtain the third sequence, where the first joint transform is a joint transform of a first phase rotation and an M×M discrete Fourier transform DFT; and performing the DFT on the second time domain sequence to obtain the fourth sequence, where first phase rotations corresponding to the M elements of the first time domain sequence are respectively $e^{-j \times 2t\pi/2M}$, where t=0, 1, . . . , M−1.

In a fifth possible implementation of the first aspect, a length of the second time domain sequence is M, the fourth sequence is M odd-numbered elements of a sequence obtained by performing a 2M×2M DFT on an extended sequence of the second time domain sequence, a length of the extended sequence of the second time domain sequence is 2M, and the last M elements of the extended sequence of the second time domain sequence are respectively opposite numbers of M elements of the second time domain sequence; and a length of the first time domain sequence is M, the third sequence is M even-numbered elements of a sequence obtained by performing a 2M×2M DFT on an extended sequence of the first time domain sequence, a length of the extended sequence of the first time domain sequence is 2M, and the last M elements of the extended sequence of the first time domain sequence are respectively the same as M elements of the second time domain sequence.

With reference to the fifth possible implementation of the first aspect, in a sixth possible implementation, before the mapping, by a sending device, a first sequence onto M even-numbered subcarriers in 2M subcarriers, and mapping a second sequence onto M odd-numbered subcarriers in the 2M subcarriers, the method further includes:

obtaining, by the sending device, the first time domain sequence x(k) and the second time domain sequence y(k); and extending, by the sending device, both the first time domain sequence x(k) and the second time domain sequence y(k) into sequences with lengths of 2M, where an extension manner of the first time domain sequence is x(k+M)=x(k), where k=0, 1, . . . , M−1, and an extension manner of the second time domain sequence is y(k+M)=−y(k) where k=0, 1, . . . , M−1, where the mapping, by a sending device, a first sequence onto M even-numbered subcarriers in 2M subcarriers, and mapping a second sequence onto M odd-numbered subcarriers in the 2M subcarriers includes:

performing, by the sending device, a 2M×2M DFT on a sum of the first time domain sequence and the second time domain sequence, and mapping a sequence obtained after the DFT onto the 2M subcarriers; or performing, by the sending device, a 2M×2M DFT on the first time domain sequence to obtain the third sequence, and mapping the third sequence onto the M even-numbered subcarriers, and performing a 2M×2M DFT on the second time domain sequence to obtain the fourth sequence, and mapping the fourth sequence onto the M odd-numbered subcarriers.

With reference to any one of the first aspect or the possible implementations of the first aspect, in a seventh possible implementation, the third sequence is a sequence predetermined by the sending device.

With reference to any one of the first aspect or the possible implementations of the first aspect, in an eighth possible implementation, the M first information elements are information elements carried by a control channel; or the M first information elements are information elements carried by a data channel; or the M first information elements are system information elements carried by a broadcast channel.

With reference to any one of the first aspect or the possible implementations of the first aspect, in a ninth possible implementation, the first time domain sequence is a sequence obtained by using the sequence predetermined by the transmit end to carry M second information elements.

With reference to the seventh or the ninth possible implementation of the first aspect, in an tenth possible implementation, the predetermined sequence is a Zadoff-Chu ZC sequence, a sequence obtained by cyclically extending a ZC sequence, a sequence obtained by truncating a ZC sequence, or a sequence corresponding to a sequence used by a reference signal in a Long Term Evolution LTE system.

With reference to any one of the first aspect or the possible implementations of the first aspect, in an eleventh possible implementation, the transmit signals include a first signal and a second signal, where a signal corresponding to the M even-numbered subcarriers is the first signal, and a signal corresponding to the M odd-numbered subcarriers is the second signal; and in the transmit signals, the first signal corresponds to a first power adjustment value, and the second signal corresponds to a second power adjustment value.

With reference to any one of the first aspect or the possible implementations of the first aspect, in a twelfth possible implementation, the 2M subcarriers may be all subcarriers on an entire bandwidth, or may be some subcarriers on an entire bandwidth.

According to a second aspect, an embodiment of the present disclosure provides a signal receiving method, including:

receiving, by a receiving device, signals from 2M subcarriers, where the 2M subcarriers are subcarriers on a same time domain symbol;

performing, by the receiving device, a fast Fourier transform FFT on the signals to obtain a first sequence and a second sequence that are received, where the first sequence is carried on M even-numbered subcarriers in the 2M subcarriers, the second sequence is carried on M odd-numbered subcarriers in the 2M subcarriers, the first sequence is one of the third sequence and the fourth sequence, the second sequence is the other of the third sequence and the fourth sequence, and the fourth sequence is a sequence carrying M first information elements; and performing, by the receiving device, signal processing on a receive signal on M subcarriers that carry the fourth sequence, to obtain the M first information elements, where for elements of a first time domain sequence corresponding to the third sequence and a second time domain sequence corresponding to the fourth sequence at a same moment, when a complex factor is taken out, one of the first time domain sequence and the second time domain sequence is an in-phase component, and the other is a quadrature component.

In a first possible implementation of the second aspect, the first sequence is the third sequence, and the second sequence is the fourth sequence; and the performing, by the receiving device, signal processing on a receive signal on M subcarriers that carry the fourth sequence, to obtain the M first information elements includes:

performing, by the receiving device, a second joint transform on the received fourth sequence carried on the M odd-numbered subcarriers, to obtain the received second time domain sequence, where the second joint transform is a joint transform of an inverse discrete Fourier transform IDFT and a second phase rotation; and demodulating, by the receiving device, the received second time domain sequence to obtain the M first information elements.

With reference to the first possible implementation of the second aspect, in a second possible implementation, the first time domain sequence is a sequence obtained by performing an IDFT on the first sequence; and second phase rotations corresponding to the M elements are respectively $e^{j \times 2t\pi/2M}$, where t=0, 1, ..., M−1.

In a third possible implementation of the second aspect, the first sequence is the fourth sequence, the second sequence is the third sequence, the first time domain sequence is a sequence obtained by performing a second joint transform on the third sequence, the second joint transform is a joint transform of an M×M IDFT and a second phase rotation, and second phase rotations corresponding to the M elements of the first time domain sequence are respectively $e^{j \times 2t\pi/2M}$, where t=0, 1, ..., M−1; and the performing, by the receiving device, signal processing on a receive signal on M subcarriers that carry the fourth sequence, to obtain the M first information elements includes:

performing, by the receiving device, an M×M IDFT on the received fourth sequence carried on the M even-numbered subcarriers, to obtain the received second time domain sequence; and demodulating, by the receiving device, the received second time domain sequence to obtain the M first information elements.

With reference to the third possible implementation of the second aspect, in a fourth possible implementation, after the performing, by the receiving device, an FFT on the signals to obtain a first sequence and a second sequence that are received, the method further includes:

performing, by the receiving device, the second joint transform on the received second sequence to obtain the first time domain sequence, where the second joint transform is the joint transform of the M×M IDFT and the second phase rotation, and the second phase rotations corresponding to the M elements of the first time domain sequence are respectively $e^{j \times 2t\pi/2M}$, where t=0, 1, ..., M−1; and demodulating, by the receiving device, the received first time domain sequence to obtain M second information elements carried by the received first time domain sequence.

In a fifth possible implementation of the second aspect, the performing, by the receiving device, signal processing on a receive signal on M subcarriers that carry the fourth sequence, to obtain the M first information elements includes:

extending, by the receiving device, the received fourth sequence to be 2M in length by inserting 0s;

performing a 2M×2M IDFT on an extended received fourth sequence to obtain the received second time domain sequence, where the received second time domain sequence is the first M elements of a sequence obtained after the IDFT or opposite numbers of the last M elements of a sequence obtained after the IDFT; and demodulating the received second time domain sequence to obtain the M first information elements.

With reference to the fifth possible implementation of the second aspect, in a sixth possible implementation, after the performing, by the receiving device, a fast Fourier transform FFT on the signals to obtain a first sequence and a second sequence that are received, the method further includes:

extending, by the receiving device, the received third sequence to be 2M in length by inserting 0s;

performing a 2M×2M IDFT on an extended received third sequence, where the received first time domain sequence is the first M elements of a sequence obtained after the IDFT or the last M elements of a sequence obtained after the IDFT; and demodulating, by the receiving device, the received first time domain sequence to obtain M second information elements carried by the third sequence.

With reference to any one of the second aspect or the possible implementations of the second aspect, in a seventh possible implementation, after the performing, by the receiving device, a fast Fourier transform FFT on the signals to obtain a first sequence and a second sequence that are received, the method further includes:

performing, by the receiving device, the channel estimation according to the received third sequence.

With reference to the seventh possible implementation of the second aspect, in an eighth possible implementation, the third sequence is a sequence predetermined by the receiving device.

With reference to the eighth possible implementation of the second aspect, in a ninth possible implementation, the predetermined sequence is a Zadoff-Chu ZC sequence, a sequence obtained by cyclically extending a ZC sequence, a sequence obtained by truncating a ZC sequence, or a sequence corresponding to a sequence used by a reference signal in a Long Term Evolution LTE system.

With reference to any one of the second aspect or the possible implementations of the second aspect, in a tenth possible implementation, the M first information elements are information elements carried by a control channel; or
the M first information elements are information elements carried by a data channel; or
the M first information elements are system information elements carried by a broadcast channel.

With reference to any one of the second aspect or the possible implementations of the second aspect, in an eleventh possible implementation, the 2M subcarriers may be all subcarriers on an entire bandwidth, or may be some subcarriers on an entire bandwidth.

According to a third aspect, a signal sending device is provided, including a processing module and a sending module, where
the processing module is configured to map a first sequence onto M even-numbered subcarriers in 2M subcarriers, and map a second sequence onto M odd-numbered subcarriers in the 2M subcarriers, where the first sequence is one of a third sequence and a fourth sequence, the second sequence is the other of the third sequence and the fourth sequence, the 2M subcarriers are subcarriers on a same time domain symbol, the fourth sequence is a sequence carrying M first information elements, and for elements of a second time domain sequence corresponding to the fourth sequence and a first time domain sequence corresponding to the third sequence at a same moment, when a complex factor is taken out, one of the first time domain sequence and the second time domain sequence is an in-phase component, and the other is a quadrature component;
the processing module is further configured to transform sequences mapped onto the 2M subcarriers to a time domain to generate transmit signals; and
the sending module is configured to send the transmit signals generated by the processing module.

In a first possible implementation of the third aspect, the first sequence is the third sequence, and the second sequence is the fourth sequence; and
the processing module is further configured to: before mapping the second sequence onto the M odd-numbered subcarriers in the 2M subcarriers, perform a first joint transform on the second time domain sequence to obtain the second sequence, where the first joint transform is a joint transform of a first phase rotation and an M×M discrete Fourier transform DFT.

With reference to the first possible implementation of the third aspect, in a second possible implementation, the first time domain sequence is a sequence obtained by performing an inverse discrete Fourier transform IDFT on the first sequence; and the processing module is configured to perform the first joint transform on the second time domain sequence to obtain the second sequence, in the following manner:
performing corresponding first phase rotations on M elements of the second time domain sequence respectively, and performing an M×M DFT on the rotated second time domain sequence to obtain the second sequence, where
the first phase rotations corresponding to the M elements are respectively $e^{-j \times 2t\pi/2M}$, where $t=0, 1, \ldots, M-1$.

In a third possible implementation of the third aspect, the first sequence is the fourth sequence, the second sequence is the third sequence, the first time domain sequence is a sequence obtained by performing a second joint transform on the second sequence, the second joint transform is a joint transform of an M×M inverse discrete Fourier transform IDFT and a second phase rotation, and second phase rotations corresponding to the M elements of the first time domain sequence are respectively $e^{j \times 2t\pi/2M}$, where $t=0, 1, \ldots, M-1$; and
the processing module is configured to map the first sequence onto the M even-numbered subcarriers in the 2M subcarriers in the following manner: performing a DFT on the second time domain sequence to obtain the first sequence, and mapping the first sequence onto the M even-numbered subcarriers.

With reference to the third possible implementation of the third aspect, in a fourth possible implementation, before mapping the first sequence onto the M even-numbered subcarriers in the 2M subcarriers, and mapping the second sequence onto the M odd-numbered subcarriers in the 2M subcarriers, the processing module is further configured to:
obtain the first time domain sequence and the second time domain sequence; perform a first joint transform on the first time domain sequence to obtain the third sequence, where the first joint transform is a joint transform of a first phase rotation and an M×M discrete Fourier transform DFT; and perform the DFT on the second time domain sequence to obtain the fourth sequence, where
the first phase rotations corresponding to the M elements of the first time domain sequence are respectively $e^{-j \times 2t\pi/2M}$, where $t=0, 1, \ldots, M-1$.

In a fifth possible implementation of the third aspect, a length of the second time domain sequence is M, the fourth sequence is M odd-numbered elements of a sequence obtained by performing a 2M×2M DFT on an extended sequence of the second time domain sequence, a length of the extended sequence of the second time domain sequence is 2M, and the last M elements of the extended sequence of the second time domain sequence are respectively opposite numbers of M elements of the second time domain sequence; and
a length of the first time domain sequence is M, the third sequence is M even-numbered elements of a sequence obtained by performing a 2M×2M DFT on an extended sequence of the first time domain sequence, a length of the extended sequence of the first time domain sequence is 2M, and the last M elements of the extended sequence of the first time domain sequence are respectively the same as M elements of the second time domain sequence.

With reference to the fifth possible implementation of the third aspect, in a sixth possible implementation, before mapping the first sequence onto the M even-numbered subcarriers in the 2M subcarriers, and mapping the second sequence onto the M odd-numbered subcarriers in the 2M subcarriers, the processing module is further configured to:
obtain the first time domain sequence x(k) and the second time domain sequence y(k); and
extend both the first time domain sequence x(k) and the second time domain sequence y(k) into sequences with lengths of 2M, where an extension manner of the first time domain sequence is x(k+M)=x(k) where $k=0, 1, \ldots, M-1$ and an extension manner of the second time domain sequence is y(k+M)=−y(k), where $k=0, 1, \ldots, M-1$, where
the processing module maps the first sequence onto the M even-numbered subcarriers in the 2M subcarriers and maps the second sequence onto the M odd-numbered subcarriers in the 2M subcarriers, in the following manner:

performing a 2M×2M DFT on a sum of the first time domain sequence and the second time domain sequence, and mapping a sequence obtained after the DFT onto the 2M subcarriers; or performing a 2M×2M DFT on the first time domain sequence to obtain the third sequence, and mapping the third sequence onto the M even-numbered subcarriers, and performing a 2M×2M DFT on the second time domain sequence to obtain the fourth sequence, and mapping the fourth sequence onto the M odd-numbered subcarriers.

With reference to any one of the third aspect or the possible implementations of the third aspect, in a seventh possible implementation, the third sequence is a sequence predetermined by the device.

With reference to any one of the third aspect or the possible implementations of the third aspect, in an eighth possible implementation, the M first information elements are information elements carried by a control channel; or
the M first information elements are information elements carried by a data channel; or
the M first information elements are system information elements carried by a broadcast channel.

With reference to any one of the third aspect or the possible implementations of the third aspect, in a ninth possible implementation, the first time domain sequence is a sequence obtained by using the sequence predetermined by the device to carry M second information elements.

With reference to the seventh or the ninth possible implementation of the third aspect, in a tenth possible implementation, the predetermined sequence is a Zadoff-Chu ZC sequence, a sequence obtained by cyclically extending a ZC sequence, a sequence obtained by truncating a ZC sequence, or a sequence corresponding to a sequence used by a reference signal in a Long Term Evolution LTE system.

With reference to any one of the third aspect or the possible implementations of the third aspect, in an eleventh possible implementation, the transmit signals include a first signal and a second signal, where a signal corresponding to the M even-numbered subcarriers is the first signal, and a signal corresponding to the M odd-numbered subcarriers is the second signal; and in the transmit signals, the first signal corresponds to a first power adjustment value, and the second signal corresponds to a second power adjustment value.

With reference to any one of the third aspect or the possible implementations of the third aspect, in a twelfth possible implementation, the 2M subcarriers may be all subcarriers on an entire bandwidth, or may be some subcarriers on an entire bandwidth.

According to a fourth aspect, an embodiment of the present disclosure provides a signal receiving device, including a receiving module and a processing module, where the receiving module is configured to receive signals from 2M subcarriers, where the 2M subcarriers are subcarriers on a same time domain symbol;

the processing module is configured to perform a fast Fourier transform FFT on the signals received by the receiving module, to obtain a first sequence and a second sequence that are received, where the first sequence is carried on M even-numbered subcarriers in the 2M subcarriers, the second sequence is carried on M odd-numbered subcarriers in the 2M subcarriers, the first sequence is one of the third sequence and the fourth sequence, the second sequence is the other of the third sequence and the fourth sequence, and the fourth sequence is a sequence carrying M first information elements; and the processing module is further configured to perform signal processing on a receive signal on M subcarriers that carry the fourth sequence, to obtain the M first information elements, where for elements of a first time domain sequence corresponding to the third sequence and a second time domain sequence corresponding to the fourth sequence at a same moment, when a complex factor is taken out, one of the first time domain sequence and the second time domain sequence is an in-phase component, and the other is a quadrature component.

In a first possible implementation of the fourth aspect, the first sequence is the third sequence, and the second sequence is the fourth sequence; and the processing module is configured to perform the signal processing on the receive signal on the M subcarriers that carry the fourth sequence, to obtain the M first information elements, in the following manner:

performing a second joint transform on the received second sequence carried on the M odd-numbered subcarriers, to obtain the received second time domain sequence, where the second joint transform is a joint transform of an inverse discrete Fourier transform IDFT and a second phase rotation; and demodulating the received second time domain sequence to obtain the M first information elements.

With reference to the first possible implementation of the fourth aspect, in a second possible implementation, the first time domain sequence is a sequence obtained by performing an IDFT on the first sequence; and second phase rotations corresponding to the M elements of the first time domain sequence are respectively $e^{j\times 2t\pi/2M}$, where t=0, 1, . . . , M−1.

In a third possible implementation of the fourth aspect, the first sequence is the fourth sequence, the second sequence is the third sequence, the first time domain sequence is a sequence obtained by performing a second joint transform on the third sequence, the second joint transform is a joint transform of an M×M IDFT and a second phase rotation, and second phase rotations corresponding to the M elements of the first time domain sequence are respectively $e^{j\times 2t\pi/2M}$, where t=0, 1, . . . , M−1; and the processing module performs the signal processing on the receive signal on the M subcarriers that carry the fourth sequence, to obtain the M first information elements, in the following manner:

performing an M×M IDFT on the received first sequence carried on the M even-numbered subcarriers, to obtain the received second time domain sequence; and demodulating the received second time domain sequence to obtain the M first information elements.

With reference to the third possible implementation of the fourth aspect, in a fourth possible implementation, after performing the FFT on the signals to obtain the first sequence and the second sequence that are received, the processing module is further configured to:

perform the second joint transform on the received second sequence to obtain the received first time domain signal, where the second joint transform is the joint transform of the M×M IDFT and the second phase rotation, and the second phase rotations corresponding to the M elements are respectively $e^{j\times 2t\pi/2M}$, where t=0, 1, . . . , M−1; and demodulate the received first time domain sequence to obtain M second information elements carried by the received first time domain sequence.

In a fifth possible implementation of the fourth aspect, that the receiving device performs signal processing on a receive signal on M subcarriers that carry the fourth sequence, to obtain the M first information elements includes:

extending, by the receiving device, the received fourth sequence to be 2M in length by inserting 0s;

performing a 2M×2M IDFT on an extended received fourth sequence, where the received second time domain sequence is the first M elements of a sequence obtained after the IDFT or opposite numbers of the last M elements of a sequence obtained after the IDFT; and demodulating the received second time domain sequence to obtain the M first information elements.

With reference to the fifth possible implementation of the fourth aspect, in a sixth possible implementation, after performing the fast Fourier transform FFT on the signals to obtain the first sequence and the second sequence that are received, the processing module is further configured to:

extend the received third sequence to be 2M in length by inserting 0s;

perform a 2M×2M IDFT on an extended received third sequence, where the received first time domain sequence is the first M elements of a sequence obtained after the IDFT or the last M elements of a sequence obtained after the IDFT; and demodulate the received first time domain sequence to obtain M second information elements carried by the received third sequence.

With reference to any one of the fourth aspect or the possible implementations of the fourth aspect, in a seventh possible implementation, after the receiving device performs the fast Fourier transform FFT on the signals to obtain the first sequence and the second sequence that are received, the device further includes:

the receiving device performs the channel estimation according to the received third sequence.

With reference to the seventh possible implementation of the fourth aspect, in an eighth possible implementation, the third sequence is a sequence predetermined by the device.

With reference to the eighth possible implementation of the fourth aspect, in a ninth possible implementation, the predetermined sequence is a Zadoff-Chu ZC sequence, a sequence obtained by cyclically extending a ZC sequence, a sequence obtained by truncating a ZC sequence, or a sequence corresponding to a sequence used by a reference signal in a Long Term Evolution LTE system.

With reference to any one of the fourth aspect or the possible implementations of the fourth aspect, in a tenth possible implementation, the M first information elements are information elements carried by a control channel; or the M first information elements are information elements carried by a data channel; or the M first information elements are system information elements carried by a broadcast channel.

With reference to any one of the fourth aspect or the possible implementations of the fourth aspect, in an eleventh possible implementation, the 2M subcarriers may be all subcarriers on an entire bandwidth, or may be some subcarriers on an entire bandwidth.

According to the foregoing embodiments, the time domain sequences corresponding to the two signals transmitted on the same time domain symbol meet a characteristic of in-phase component and quadrature component transmission, that is, the elements of the time domain sequences corresponding to the two signals transmitted on the same time domain symbol are I/Q orthogonal; therefore, when the two signals are simultaneously transmitted on the same time domain symbol (for example, one symbol), because an amplitude value of a signal obtained after the two signals are superposed can keep a low peak-to-average ratio, a case in which the two signals may be in phase and may be out of phase can be avoided. Therefore, the signal obtained after the two signals are superposed is unlikely to have a high peak-to-average ratio caused by phase randomness, and a peak-to-average ratio increases little. In addition, the two signals are respectively sent on the M even-numbered subcarriers and the M odd-numbered subcarriers in the 2M subcarriers, the two signals meet a frequency-division and orthogonal characteristic, one signal is not on a subcarrier of the other signal, and the two signals can be easily distinguished. Therefore, there is little or no interference between the two signals during reception.

DESCRIPTION OF EMBODIMENTS

Figure 1:
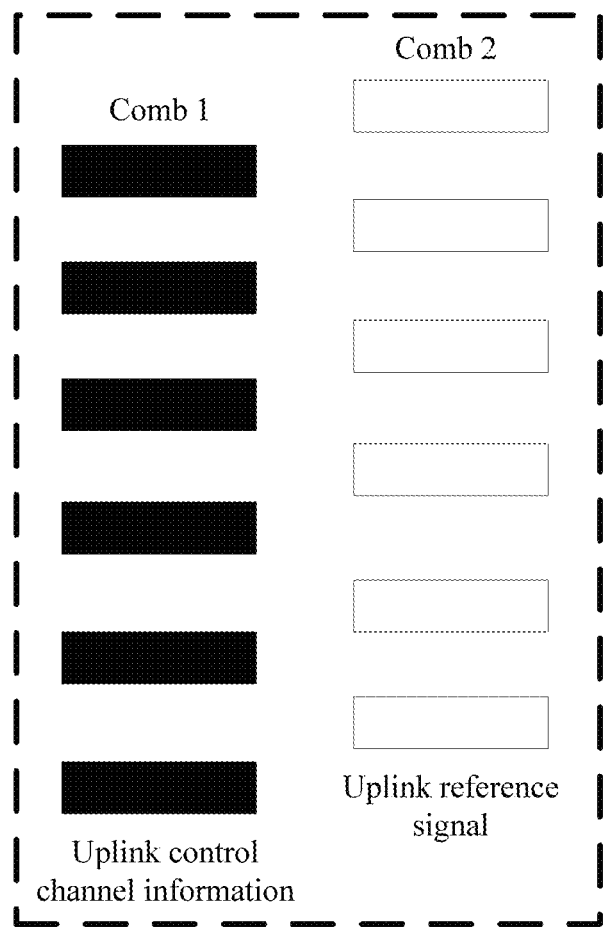
FIG. 1 is a schematic diagram of frequency domain resource division according to an embodiment of the present disclosure.

In the prior art, an uplink control channel and an uplink reference signal of a terminal device are generally sent in a time division manner. In order that the terminal device simultaneously sends the uplink control information and the uplink reference signal on a same time domain symbol (for example, an SC-FDMA time domain symbol), an applicable solution is as follows: At least one to-be-transmitted physical resource block on the time domain symbol is divided into two carrier groups that do not overlap with each other, and the two carrier groups are used to send the uplink control information and the uplink reference signal, respectively. That is, the at least one to-be-transmitted physical resource block is frequency-divided into two combs. As shown in FIG. 1, a comb 1 (comb 1) is used to send the uplink control information, and a comb 2 (comb 2) is used to send the uplink reference signal. However, in the foregoing solution, when the uplink control information and the uplink reference signal are simultaneously sent on one time domain symbol, at least one physical resource block of one time domain symbol is divided into two combs, to simultaneously send the uplink control information and the uplink reference signal, that is, two signals are sent. An SC-FDMA signal on each comb may have a relatively good peak-to-average ratio characteristic in a time domain. However, when the two signals are sent on the same time domain symbol, the two signals may be nearly in phase at some sampling points, resulting in a strengthened transmit signal; and the two signals may be nearly out of phase at some other sampling points, resulting in a weakened transmit signal. Therefore, a relatively high peak-to-average ratio is caused.

Embodiments of the present disclosure provide a signal sending method, so as to simultaneously transmit two signals on a same time domain symbol and reduce a high peak-to-average ratio caused by superposition of the two signals. In the following description, the time domain symbol is referred to as a symbol for short.

The embodiments of the present disclosure may be applied to a communications system including an access network device and a terminal device (terminal device or terminal equipment). It should be noted that, in the embodiments of the present disclosure, the terminal device may also be referred to as a terminal, user equipment (UE), a mobile station (MS), a mobile terminal, or the like. The terminal device may communicate with one or more core networks by using a radio access network (RAN). For example, the terminal device may be a mobile phone (also referred to as a cellular phone), a computer with a mobile terminal, or the like, or may be a portable, pocket-sized, handheld, computer built-in, or in-vehicle mobile apparatus, which exchanges voice and/or data with the radio access network. The access network device may be a base station, an enhanced base station, a relay having a scheduling function, a device having abase station function, or the like. The base station may be an evolved NodeB (evolved Node B, eNB or e-NodeB) in an LTE system, or may be a base station in another system. This is not limited in the embodiments of the present disclosure. Subsequent embodiments are described by using the base station as an example, but it does not indicate that the embodiments of the present disclosure are limited only to the base station.

A resource block for transmitting a signal includes a time domain resource and a frequency domain resource. For example, in the LTE system, the time domain resource may include an OFDM or SC-FDMA symbol, and the frequency domain resource may include a subcarrier. In a current LTE system, one resource block includes 14 OFDM symbols or SC-FDMA symbols (which are referred to as time domain symbols or symbols for short in the embodiments of the present disclosure) in a time domain, and includes 12 subcarriers in a frequency domain. In the embodiments of the present disclosure, the time domain symbol may be but is not limited to the OFDM or SC-FDMA symbol in the LTE system. For example, the time domain symbol may be an OFDM or SC-FDMA symbol in a time domain in another system or a unit in a time domain in another form.

Technical solutions provided in the embodiments of the present disclosure are intended to simultaneously transmit the two signals on the same time domain symbol, for example, transmit two signals on one time domain symbol, and reduce a high peak-to-average ratio caused by superposition of the two signals.

It should be noted that the two signals mentioned in the embodiments of the present disclosure may be two different signals, or may be two parts of a signal, but the embodiments of the present disclosure are not limited to only two signals. In addition, the time domain symbol described in the embodiments of the present disclosure is a time domain unit of a resource for transmitting a signal, for example, may be an OFDM symbol, or may be another time domain symbol. The same time domain symbol described in the embodiments of the present disclosure may be one symbol, or may be multiple time domain symbols. Simultaneously transmitting the two signals on the same time domain symbol may be as follows: If the time domain symbol is one symbol, the two signals are simultaneously transmitted on the symbol; or if the time domain symbol is at least two symbols, the two signals are simultaneously transmitted on each of the at least two symbols.

In addition, in the embodiments of the present disclosure, a sending device is configured to send a signal, and a receiving device is configured to receive the signal sent by the sending device. The sending device may be the terminal device, or may be the access network device. If the sending device is the terminal device, correspondingly, the receiving device may be the access network device. In this case, the signal is an uplink signal. If the sending device is the access network device, the receiving device may be the terminal device. In this case, the signal is a downlink signal.

It should be noted that although the method in the embodiments of the present disclosure is proposed based on an issue of simultaneously sending the uplink control information and the uplink reference signal, the two signals in the embodiments of the present disclosure are not limited to the uplink control information and the uplink reference signal. For example, if the signal is the uplink signal, the two signals may be respectively the uplink reference signal and the uplink control information, or may be respectively the uplink reference signal and data carried by an uplink data channel, or may be two different uplink reference signals. If the signal is the downlink signal, the two signals may be a downlink reference signal and downlink control information, or may be physical broadcast channel information and primary synchronization channel information, or may be physical broadcast channel information and secondary synchronization channel information, or may be primary synchronization channel information and secondary synchronization channel information, or may be two parts of primary synchronization channel information, or may be two parts of secondary synchronization channel information, or may be data carried by two data channels of different terminal devices and control information carried by two control channels of the different terminal devices, or may be data carried by data channels of different terminal devices and control information carried by control channels of the different terminal devices, which are not listed one by one in the embodiments of the present disclosure.

Figure 2:
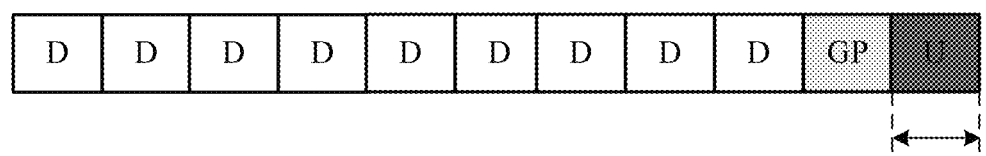
FIG. 2 is a schematic diagram of a frame structure used in an embodiment of the present disclosure.

The method in the embodiments of the present disclosure may be applied to an existing frame structure system, or may be applied to another frame structure system, such as a frame structure in a high-frequency transmission system. For example, the method may be applied to a frame structure system shown in FIG. 2, in which "U" indicates an uplink frame, "D" indicates a downlink frame, and "GP" indicates a guard period. In a TDD system, to ensure a low-delay requirement of high-frequency transmission, a frame structure of a special subframe shown in FIG. 2 may be designed, and both a time domain symbol used for transmitting uplink control information and a time domain symbol used for transmitting downlink control information are reserved in the special subframe. In FIG. 2, the last symbol of the special subframe is used as a reserved uplink symbol for transmitting the uplink control information, such as acknowledgement/negative acknowledgement (ACK/NACK) information transmitted on a downlink data channel.

With reference to specific embodiments, the following describes how to implement sending or receiving of at least two signals on a same time domain symbol in the embodiments of the present disclosure.

Figure 3:
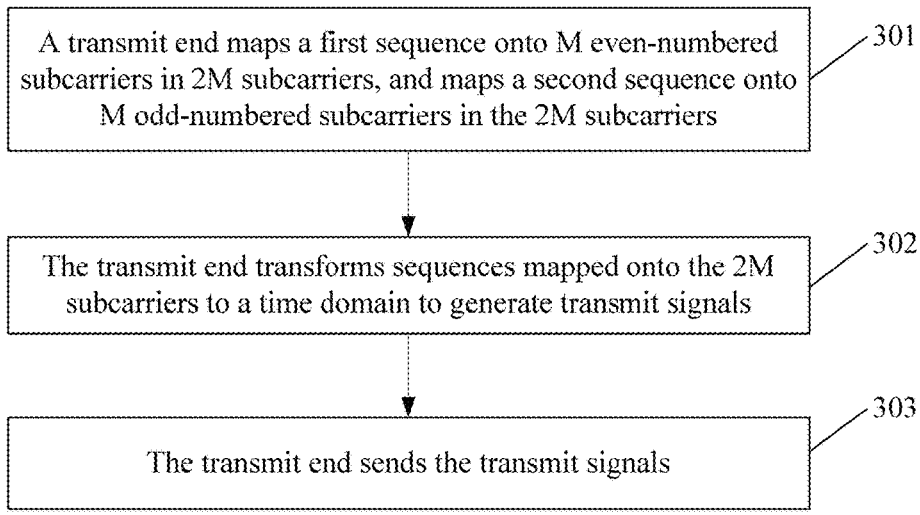
FIG. 3 is a schematic flowchart of a signal sending method according to an embodiment of the present disclosure.

FIG. 3 is a schematic flowchart of a signal sending method according to an embodiment of the present disclosure. The method includes the following steps:

Step 301: A sending device maps a first sequence onto M even-numbered subcarriers in 2M subcarriers, and maps a second sequence onto M odd-numbered subcarriers in the 2M subcarriers, where the first sequence is one of a third sequence and a fourth sequence, the second sequence is the other of the third sequence and the fourth sequence, the 2M subcarriers are subcarriers on a same time domain symbol, the fourth sequence is a sequence carrying M first information elements, and for elements of a second time domain sequence corresponding to the fourth sequence and a first time domain sequence corresponding to the third sequence at a same moment, when a complex factor is taken out, one of the first time domain sequence and the second time domain sequence is an in-phase component (In-phase component, I component), and the other is a quadrature component (Quadrature component, Q component), or if expressed as a complex number, one is a real part, and the other is an imaginary part. The true is for the following description, and details are not repeatedly described in this specification.

Step 302: The sending device transforms sequences mapped onto the 2M subcarriers to a time domain to generate transmit signals.

Step 303: The sending device sends the transmit signals.

Optionally, before step 301, the method further includes the following step:

Step 300: The sending device generates the second time domain sequence and the third sequence.

The sending device may directly generate the third sequence, or may first generate the first time domain sequence and then generate the third sequence.

For example, if the third sequence is a reference signal sequence, the sending device does not need to generate the first time domain sequence. However, from the perspective of a time domain sequence corresponding to the third sequence, that is, the first time domain sequence, the foregoing I/Q orthogonal characteristic is met, that is, for the elements of the second time domain sequence and the first time domain sequence at the same moment, when the complex factor is taken out, one of the elements of the first time domain sequence and the second time domain sequence is an in-phase component, and the other is a quadrature component.

The time domain sequence corresponding to the third sequence may be obtained by performing an inverse discrete Fourier transform (IDFT) on the third sequence.

In this embodiment, for the elements of the second time domain sequence and the first time domain sequence at the same moment, when the complex factor is taken out (that is, a common complex factor is factored out), one of the first time domain sequence and the second time domain sequence is an in-phase component, and the other is a quadrature component. That is, the time domain sequences corresponding to the two signals meet the I/Q orthogonal characteristic.

The first time domain sequence and the second time domain sequence may be separately constructed. Alternatively, the second time domain sequence may be constructed based on the third sequence, or the second time domain sequence and the third sequence are constructed based on a same rule, for example, both constructed based on a same Zadoff-Chu (ZC) sequence. In this embodiment of the present disclosure, how to construct the second time domain sequence and the third sequence is not limited. Preferably, the sequence used for carrying the M first information elements and the third sequence are sequences with an approximately constant modulus characteristic, or sequences with a low peak-to-average ratio (or a low cubic metric). For example, a sequence $z(t)$ formed by complex factors at different moments is a sequence with a low peak-to-average ratio (or a small cubic metric), where $t=0, 1, 2, \ldots, M-1$. For example, in an LTE system, for time domain sequences corresponding to sequences used by a reference signal, when $z(t)$ is taken out, one of a first time domain signal and a second time domain signal is a real number, and the other is an imaginary number.

Optionally, if the third sequence corresponds to the reference signal, the fourth sequence may be constructed based on the third sequence, and the fourth sequence carries the M first information elements. For example, a sequence used for modulating the M first information elements may be constructed based on the third sequence. Optionally, the second time domain sequence is obtained based on the M first information elements carried by the third sequence. For example, if the third sequence is $a(0), a(1), \ldots, a(M-1)$, and the time domain sequence corresponding to the third sequence is $x(0), x(1), \ldots, x(M-1)$, the second time domain sequence obtained based on the M first information elements carried by the third sequence may be: $x(0)\times(+j \text{ or } -j)\times Q, x(1)\times(+j \text{ or } -j)\times Q, \ldots, x(M-1)\times(+j \text{ or } -j)\times Q$, where Q is a positive real number. To-be-transmitted information carried on a $t^{th}$ element of the second time domain sequence is $+j$ or $-j$. When the first sequence is the third sequence, that is, the third sequence is mapped onto even-numbered subcarriers, a transform from the third sequence $a(0), a(1), \ldots, a(M-1)$ to the time domain sequence $x(0), x(1), \ldots, x(M-1)$ corresponding to the third sequence may be an IDFT. In addition, before being mapped onto the M subcarriers, the third sequence may undergo power adjustment to become $V*(a(0), a(1), \ldots, a(M-1))$, where V is a power adjustment quantity and is a positive real number. Before being mapped onto the M subcarriers, the fourth sequence $c(0), c(1), \ldots, c(M-1)$ may undergo power adjustment, that is, be multiplied by a positive real constant U, to become $U*(c(0), c(1), \ldots, c(M-1))$, where U is a power adjustment quantity.

Alternatively, the sequence used for carrying the M first information elements may be a sequence obtained by using a predefined rule that is the same as that of the third sequence.

Certainly, the sequence used for carrying the M first information elements may be independent of the time domain sequence corresponding to the third sequence. That is, the sequence used for carrying the M first information elements may be a sequence obtained by using a predetermined rule, instead of being constructed based on the time domain sequence corresponding to the third sequence.

The M information elements may be M information elements obtained after encoding, rate matching, or repetition is performed on original information elements.

In this embodiment, the third sequence may be expressed as a(k), where k=0, 1, . . . , M−1 The time domain sequence corresponding to the third sequence, that is, the first time domain sequence, is expressed as x(t)=z(t)×g(t). The second time domain sequence may be expressed as y(t)=z(t)×$Q_t$×h (t), where t=0, 1, . . . , M−1, z(t) may be a $t^{th}$ element of a sequence with a low peak-to-average power ratio (peak-to-average power ratio, PAPR), and $Q_t$=j or −j.

In an embodiment, in the first time domain sequence and the second time domain sequence, a value of g(t) is +1×P or −1×P, where P is a positive amplitude value (positive real number). Whether the value of g(t) is +1×P or −1×P depends on a to-be-sent information element carried by the third sequence. In this case, a value of h(t) is +1×Q or −1×Q, where Q is a positive amplitude value. Likewise, whether the value of h(t) is +1×Q or −1×Q depends on a to-be-sent information element carried by the fourth sequence, that is, depends on the M first information elements in the foregoing embodiment. For example, when a $t^{th}$ element in the M first information elements is 1, h(t) is +1×Q; or when a $t^{th}$ element in the M first information elements is −1, h(t) is −1×Q. Alternatively, when a $t^{th}$ element in the M first information elements is 1, h(t) is −1×Q; or when a $t^{th}$ element in the M first information elements is −1, h(t) is +1×Q. It can be learned that, if P=Q, the first time domain sequence and the second time domain sequence have a same power. That is, the first signal and the second signal are sent at a same power. However, if P≠Q, the first time domain sequence and the second time domain sequence have different powers, that is, the first signal and the second signal are sent at different powers, and the sending device may configure different P and Q according to different channels, so as to configure different transmit powers for the different channels. For example, a transmit power of a reference signal channel may be different from a transmit power of a data signal, and there may be a power offset quantity.

In another embodiment, in the first time domain sequence and the second time domain sequence, a value of g(t) is +1×P×j or −1×P×j, where P is a positive real number. Whether the value of g(t) is +1×P×j or −1×P×j depends on a to-be-sent information element carried by the first time domain sequence. In this case, a value of h(t) is +1×Q×j or −1×Q×j, where Q is a positive real number. Likewise, whether the value of h(t) is +1×Q×j or −1×Q×j depends on a to-be-sent information element carried by the second time domain sequence, that is, depends on the M first information elements in the foregoing embodiment. For example, when a $t^{th}$ element in the M first information elements is 1, h(t) is +1×Q×j; or when a $t^{th}$ element in the M first information elements is −1, h(t) is −1×Q×j. Alternatively, when a $t^{th}$ element in the M first information elements is 1, h(t) is −1×Q×j; or when a $t^{th}$ element in the M first information elements is −1, h(t) is +1×Q×j.

In still another embodiment, the third sequence may be expressed as a(k), where k=0, 1, . . . , M−1. The time domain sequence corresponding to the third sequence, that is, the first time domain sequence, is expressed as x(t)=z(t)×g(t). The second time domain sequence may be expressed as y(t)=z(t)×g(t)×Q×h(t), where t=0, 1, . . . , M−1, and z(t) is a $t^{th}$ element of a sequence with a low peak-to-average power ratio (peak-to-average power ratio, PAPR). Optionally, z(t)=1 or a complex number or a complex constant whose modulus is 1, and a value of Q does not vary with that of t, and may be j or −j. g(t) is a signal modulated by means of binary phase shift keying (BPSK), quadrature phase shift keying (QPSK), or any quadrature amplitude modulation (QAM). A value of h(t) is +1×Q or −1×Q, where Q is a positive amplitude value. In this embodiment, $Q_t$ indicates an imaginary unit, and whether the value of h(t) is +1×Q or −1×Q depends on a to-be-sent information element carried by the second time domain sequence. Because g(t) may be a signal modulated by means of QPSK or any QAM, a relatively high-order modulation mode is used for signal transmission, and an information bit quantity corresponding to each signal is increased. In this way, the implementation can implement transmission of more information values and can keep a relatively low peak-to-average ratio.

In addition, the two signals transmitted on the same time domain symbol keep a relatively low peak-to-average ratio, and therefore, the two signals can be used as one equivalent transmission signal that occupies the 2M subcarriers (the signal on the 2M subcarriers is transformed to a signal in a time domain by means of a 2M*2M IDFT, and has a good peak-to-average ratio characteristic). The equivalent transmission signal and another transmission signal that occupies 2M subcarriers are sent in a comb frequency-division and orthogonal manner. Optionally, the another transmission signal is a signal modulated based on BPSK. Each signal is equally spaced subcarriers with a spacing of 2 kHz, and comb frequency division multiplexing of the two signals occupies a total of 4M equally spaced subcarriers with a spacing of k. Likewise, in this case, time domain sequences corresponding to the two signals corresponding to odd-numbered subcarriers and even-numbered subcarriers in the 4M subcarriers still meet the I/Q orthogonal characteristic of in-phase component and quadrature component transmission. Therefore, the peak-to-average ratio characteristic is good. If k is a positive even number, comb frequency division multiplexing may continue to be performed on the signals on the 4M subcarriers and signals on other 4M subcarriers, and a good peak-to-average ratio characteristic is kept until k=0.

The time domain sequences corresponding to the two signals transmitted on the same time domain symbol meet the characteristic of the in-phase component and quadrature component transmission, that is, the elements of the time domain sequences corresponding to the two signals transmitted on the same time domain symbol are I/Q orthogonal; therefore, when the two signals are simultaneously transmitted on the same time domain symbol (for example, one symbol), an amplitude value of a signal obtained after the two signals are superposed can keep a low peak-to-average ratio. Therefore, the signal obtained after the two signals are superposed is unlikely to have a high peak-to-average ratio caused by phase randomness, and a peak-to-average ratio increases little. In addition, the two signals meet a frequency-division and orthogonal characteristic, one signal is not on a subcarrier of the other signal, and the two signals can be easily distinguished. Therefore, there is little or no interference between the two signals during reception.

Optionally, the 2M subcarriers may be 2M equally spaced subcarriers in a frequency domain, and then may have a good peak-to-average ratio or cubic metric characteristic.

It should be specifically noted that, in this embodiment of the present disclosure, if all the 2M subcarriers are numbered, and a first subcarrier is numbered 0, the 2M subcarriers are numbered 0, 1, . . . , and 2M−1, respectively. The M even-numbered subcarriers are subcarriers 0, 2, 4, . . . , and 2M−2, and the M odd-numbered subcarriers are subcarriers 1, 3, 5, . . . , and 2M−1. Meanings of the M odd-numbered subcarriers and the M even-numbered subcarriers in all embodiments of the present disclosure are understood in the same way. The following description is based on the meanings.

If all the 2M subcarriers are numbered, and a first subcarrier is numbered 1, the M odd-numbered subcarriers in all embodiments of the present disclosure shall be M even-numbered subcarriers in this case, and the M even-numbered subcarriers shall be M odd-numbered subcarriers in this case. That is, the M even-numbered subcarriers in the embodiments of the present disclosure are subcarriers 1, 3, 5, . . . , and 2M−1 in this case, and the M odd-numbered subcarriers in the embodiments of the present disclosure are subcarriers 2, 4, 6, . . . , and 2M in this case.

Optionally, before being mapped onto the subcarriers, the third sequence and the fourth sequence may further undergo power adjustment separately, that is, each element of the third sequence is multiplied by a positive real constant V, and each element of the fourth sequence is multiplied by a positive real constant U, so that a combined time domain signal that is finally output keeps a good peak-to-average ratio characteristic.

In this embodiment of the present disclosure, the M odd-numbered subcarriers and the M even-numbered subcarriers may be considered as two combs. The M even-numbered subcarriers may be considered as a comb 1, and the M odd-numbered subcarriers may be considered as a comb 2. The third sequence and the fourth sequence may be mapped onto the comb 1 and the comb 2, respectively, or may be mapped onto the comb 2 and the comb 1, respectively. For different mapping manners, there may be different embodiments.

First Optional Embodiment

The sending device maps the third sequence onto the M even-numbered subcarriers, and maps the fourth sequence onto the M odd-numbered subcarriers. That is, the first sequence and the third sequence are a same sequence, and are mapped onto the M even-numbered subcarriers; the second sequence and the fourth sequence are a same sequence, and are mapped onto the M odd-numbered subcarriers. The second time domain sequence corresponding to the second sequence (that is, the fourth sequence) is a sequence carrying the M first information elements, that is, the second sequence carries the M first information elements.

In this way, before the mapping, by a sending device, a second sequence onto M odd-numbered subcarriers in the 2M subcarriers, the embodiment further includes:

performing, by the sending device, a first joint transform on the second time domain sequence to obtain the second sequence, where the first joint transform is a joint transform of a first phase rotation and an M×M discrete Fourier transform DFT.

The M×M DFT in this embodiment of the present disclosure may be shown as the following formula:

$$X(n) = \frac{1}{\sqrt{M}} \sum_{t=0}^{M-1} f(t) e^{-j \times 2t \cdot n \cdot \pi / M},$$

$$n = 0, 1, \ldots, M-1$$

(which may alternatively be another variant definition, for example, $$X(n) = \sum_{t=0}^{M-1} f(t) e^{-j \times 2t \cdot n \cdot \pi / M},$$

$$n = 0, 1, \ldots, M-1 \Big)$$

where M is any positive integer, {X(n)} is a frequency domain sequence obtained after the transform, and is a number of a frequency domain subcarrier. An M×M IDFT in this embodiment of the present disclosure may be shown as the following formula:

$$x(n) = \frac{1}{\sqrt{M}} \sum_{k=0}^{M-1} X(k) \cdot e^{j 2\pi k n / M},$$

$$n = 0, 1, \ldots, M-1$$

which may alternatively be another variant definition, for example, $$x(n) = \frac{1}{\sqrt{M}} \sum_{k=0}^{M-1} X(k) \cdot e^{j 2\pi k n / M},$$

$$n = 0, 1, \ldots, M-1 \Big)$$

where x(n) is a time domain sequence obtained after the transform, n is a moment value corresponding to the time domain sequence, X(k) is a corresponding frequency domain sequence, and k is a number of a frequency domain subcarrier.

f(t) is a corresponding time domain sequence. For example, for the first time domain sequence, f(t) herein is the foregoing x(t), and for the second time domain sequence, f(t) herein is the following y(t). The M×M DFT transform corresponds to mapping onto all the even-numbered subcarriers in the 2M subcarriers. Therefore, when the frequency domain sequence obtained after the transform needs to be mapped onto the odd-numbered subcarriers, the first phase rotation needs to be performed on the second time domain sequence, so as to implement an offset from a mapping frequency of the even-numbered subcarriers to a mapping frequency of the odd-numbered subcarriers. It should be noted that the first phase rotation and the M×M discrete Fourier transform DFT may be implemented at the same time, or the first joint transform may be equivalent to first performing the first phase rotation on the second time domain sequence, and then performing the M×M DFT on the rotated second time domain sequence.

When the second time domain sequence is y(0), y(1), . . . , y(M−1), and the fourth sequence is b(0), b(1), . . . , b(M−1) a relationship between the second sequence and the second time domain sequence may be expressed as {b(i)}=A{y(i)}, i=0, 1, . . . , M−1. The first joint transform A may be a product of the first phase rotation transform B and the discrete Fourier transform C, that is, A=CB.

Further, the first joint transform is a joint transform of first phase rotations corresponding to M elements and the M×M discrete Fourier transform DFT, where the first phase rotations corresponding to the M elements are respectively $e^{-j \times 2t\pi/2M}$, where t=0, 1, . . . , M−1.

For example, if the first phase rotation is first performed on the second time domain sequence, and then the M×M DFT is performed on the rotated second time domain sequence, the step of performing, by the sending device, a joint transform on the second time domain sequence to obtain the second sequence includes:

respectively performing, by the sending device, corresponding first phase rotations on M elements of the second time domain sequence, and performing the M×M DFT on the rotated second time domain sequence to obtain the second sequence.

The first phase rotations corresponding to the M elements are respectively $e^{j\times 2t\pi/2M}$, where t=0, 1, . . . , M−1.

Specifically, the second time domain sequence is expressed as y(t), where t=0, 1, . . . , M−1, and the rotated second time domain sequence is $y(t)e^{-j\times 2t\pi/2M}$.

In this implementation, if the third sequence carries M second information elements, before the mapping, by a sending device, a first sequence onto M even-numbered subcarriers in 2M subcarriers, and mapping a second sequence onto M odd-numbered subcarriers in the 2M subcarriers, the method further includes:

obtaining, by the sending device, the first time domain sequence and the second time domain sequence; and
performing, by the sending device, the M×M DFT on the first time domain sequence to obtain the third sequence.

If the third sequence is a reference signal sequence and carries no information element, the sending device only needs to map the third sequence onto the M even-numbered subcarriers in the 2M subcarriers.

Second Optional Embodiment

The sending device maps the fourth sequence onto the M even-numbered subcarriers, and maps the third sequence onto the M odd-numbered subcarriers. That is, the first sequence and the fourth sequence are a same sequence, and are mapped onto the M even-numbered subcarriers; the second sequence and the third sequence are a same sequence, and are mapped onto the M odd-numbered subcarriers.

In this way, the mapping a second sequence onto M odd-numbered subcarriers in the 2M subcarriers includes: mapping, by the sending device, the third sequence onto the M odd-numbered subcarriers; and the mapping a first sequence onto M even-numbered subcarriers in 2M subcarriers includes: performing, by the sending device, an M×M DFT on the second time domain sequence to obtain the fourth sequence, and mapping the fourth sequence onto the M even-numbered subcarriers.

In this case, the sending device does not generate the first time domain sequence, but from the perspective of a time domain, for the third sequence, the first time domain sequence corresponding to the third sequence is a sequence obtained by performing a second joint transform on the second sequence (that is, the third sequence). The second joint transform is a joint transform of an M×M inverse discrete Fourier transform (inverse discrete Fourier transform, IDFT) and a second phase rotation. Second phase rotations corresponding to the M elements of the first time domain sequence are respectively $e^{j\times 2t\pi/2M}$, where t=0, 1, . . . , M−1. The second joint transform is an inverse transform of the first joint transform.

Specifically, the first time domain sequence is expressed as x(t), and the second time domain sequence is expressed as y(t), where t=0, 1, . . . , M−1. In this way, a sequence obtained by performing the IDFT transform on the third sequence a(k) is x(t) $e^{-j\times 2t\pi/2M}$, and the second phase rotation is performed on x(t) $e^{-j\times 2t\pi/2M}$ to obtain x(t).

In this implementation, if the third sequence carries M second information elements, before the mapping, by a sending device, a first sequence onto M even-numbered subcarriers in 2M subcarriers, and mapping a second sequence onto M odd-numbered subcarriers in the 2M subcarriers, the method further includes:

obtaining, by the sending device, the first time domain sequence and the second time domain sequence; and
performing, by the sending device, a first phase rotation on the first time domain sequence, performing a DFT on the rotated first time domain sequence to obtain the third sequence, and performing the DFT on the second time domain sequence to obtain the fourth sequence.

First phase rotations corresponding to the M elements of the first time domain sequence are respectively $e^{j\times 2t\pi/2M}$, where t=0, 1, . . . , M−1.

In the first optional embodiment and the second optional embodiment, whether a correspondence between a time domain signal and a frequency domain signal is an M×M DFT transform or a joint transform of a first linear phase rotation and an M×M DFT transform is determined according to whether a subcarrier onto which a sequence is mapped is an even-numbered subcarrier or an odd-numbered subcarrier, and therefore an I/Q orthogonal characteristic of the first time domain sequence and the second time domain sequence can be ensured. In this way, a peak-to-average ratio (or a cubic metric) brought together by a first time domain signal and a second time domain signal reflects a peak-to-average ratio (or a cubic metric) of an actual signal that is finally transmitted.

Third Optional Embodiment

Before the mapping, by the sending device, the fourth sequence onto the M odd-numbered subcarriers in the 2M subcarriers, the method further includes:

performing, by the sending device, a 2M×2M DFT on an extended sequence of the second time domain sequence.

In this implementation, the second sequence is the fourth sequence, a length of the second time domain sequence is M, the second sequence is M odd-numbered elements of a sequence obtained by performing the 2M×2M DFT on the extended sequence of the second time domain sequence, a length of the extended sequence of the second time domain sequence is 2M, and the last M elements of the extended sequence of the second time domain sequence are respectively opposite numbers of M elements of the second time domain sequence. Therefore, the extended sequence of the second time domain sequence is an antisymmetric sequence. It is known according to a characteristic of the DFT that, a value of a sequence obtained by performing the DFT on an antisymmetrically extended sequence is 0 on an even-numbered subcarrier. Therefore, after the 2M×2M DFT, the second time domain sequence is mapped onto the M odd-numbered subcarriers. In this case, the third sequence can be mapped onto the M even-numbered subcarriers, and the fourth sequence can be mapped onto the M odd-numbered subcarriers.

In this case, from the perspective of a time domain, for the third sequence, a length of the first time domain sequence is M, the third sequence is M even-numbered elements of a sequence obtained by performing a 2M×2M DFT on an extended sequence of the first time domain sequence, a length of the extended sequence of the first time domain sequence is 2M, and the last M elements of the extended sequence of the first time domain sequence are the same as M elements of the first time domain sequence. Therefore, the extended sequence of the first time domain sequence is a symmetric sequence. It is known according to a characteristic of the DFT that, a value of a sequence obtained by performing the DFT on a symmetrically extended sequence is 0 on an odd-numbered subcarrier. The first time domain sequence is the first M elements of a time domain sequence with a length of 2M that is obtained by performing the 2M×2M IDFT on a sequence with a length of 2M obtained by inserting 0s into the third sequence on odd-numbered counters in a frequency domain. An operation of inserting 0s may be expressed as: a1, a2, a3, . . . →a1, 0, a2, 0, a3, 0, . . . .

Further, if the third sequence carries M second information elements or the sending device directly generates the first time domain sequence instead of the third sequence, before the mapping, by a sending device, a first sequence onto M even-numbered subcarriers in 2M subcarriers, and mapping a second sequence onto M odd-numbered subcarriers in the 2M subcarriers, the method further includes:

obtaining, by the sending device, the first time domain sequence and the second time domain sequence; and extending, by the sending device, both the first time domain sequence and the second time domain sequence into sequences with lengths of 2M, where an extension manner of the first time domain sequence is x(k+M)=x(k), where k=0, 1, . . . , M−1, and an extension manner of the second time domain sequence is y(k+M)=−y(k), where k=0, 1, . . . , M−1; and the mapping, by a sending device, a first sequence onto M even-numbered subcarriers in 2M subcarriers, and mapping a second sequence onto M odd-numbered subcarriers in the 2M subcarriers includes:

performing, by the sending device, a 2M×2M DFT on a sum of the first time domain sequence and the second time domain sequence, and mapping a sequence obtained after the DFT onto the 2M subcarriers; or performing, by the sending device, a 2M×2M DFT on an extended sequence of the first time domain sequence, to obtain the third sequence (even-numbered elements of a sequence with a length of 2M obtained after the DFT), and mapping the third sequence onto the M even-numbered subcarriers, and performing a 2M×2M DFT on an extended sequence of the second time domain sequence, to obtain the fourth sequence (odd-numbered elements of a sequence with a length of 2M obtained after the DFT), and mapping the fourth sequence onto the M odd-numbered subcarriers.

Optionally, if the third sequence carries no information element, and is only a reference signal sequence, before the mapping, by a sending device, a first sequence onto M even-numbered subcarriers in 2M subcarriers, and mapping a second sequence onto M odd-numbered subcarriers in the 2M subcarriers, the method further includes:

obtaining, by the sending device, the second time domain sequence; and extending, by the sending device, the second time domain sequence into a sequence with a length of 2M, where an extension manner of the second time domain sequence is y(k+M)=−y(k), where k=0, 1, . . . , M−1.

Further, the mapping, by a sending device, a first sequence onto M even-numbered subcarriers in 2M subcarriers, and mapping a second sequence onto M odd-numbered subcarriers in the 2M subcarriers includes:

mapping, by the sending device, the third sequence onto the M even-numbered subcarriers, performing a 2M×2M DFT on the extended sequence of the second time domain sequence to obtain the fourth sequence (odd-numbered elements of a sequence with a length of 2M obtained after the DFT), and mapping the fourth sequence onto the M odd-numbered subcarriers.

Fourth Optional Embodiment

A difference from the third optional embodiment is that, in this embodiment, in an extended sequence of the second time domain sequence, the last M elements are respectively the same as the first M elements; correspondingly, from the perspective of a time domain, for a time domain sequence corresponding to the third sequence, that is, the first time domain sequence, in an extended sequence of the first time domain sequence, the last M elements are respectively opposite numbers of the first M elements.

Before the mapping, by the sending device, the fourth sequence to the M even-numbered subcarriers in the 2M subcarriers, the method further includes:

performing, by the sending device, a 2M×2M DFT on an extended sequence of the second time domain sequence.

In this implementation, the first sequence is the fourth sequence, and the second sequence is the third sequence. A length of the second time domain sequence is M, the fourth sequence is M even-numbered elements of a sequence obtained by performing a 2M×2M DFT on an extended sequence of the second time domain sequence, a length of the extended sequence of the second time domain sequence is 2M, and the last M elements of the extended sequence of the second time domain sequence are the same as M elements of the second time domain sequence.

In this case, from the perspective of a time domain, for the third sequence, a length of the first time domain sequence is M, the third sequence is M odd-numbered elements of a sequence obtained by performing a 2M×2M DFT on an extended sequence of the first time domain sequence, a length of the extended sequence of the first time domain sequence is 2M, and the last M elements of the extended sequence of the first time domain sequence are opposite numbers of the first M elements of the first time domain sequence.

Further, if the third sequence carries M second information elements or the sending device directly generates the first time domain sequence instead of the third sequence, before the mapping, by a sending device, a first sequence onto M even-numbered subcarriers in 2M subcarriers, and mapping a second sequence onto M odd-numbered subcarriers in the 2M subcarriers, the method further includes:

obtaining, by the sending device, the first time domain sequence and the second time domain sequence; and extending, by the sending device, both the first time domain sequence and the second time domain sequence into sequences with lengths of 2M, where an extension manner of the first time domain sequence is x(k+M)=−x(k), where k=0, 1, . . . , M−1, and an extension manner of the second time domain sequence is y(k+M)=y(k), where k=0, 1, . . . , M−1; and the mapping, by a sending device, a first sequence onto M even-numbered subcarriers in 2M subcarriers, and mapping a second sequence onto M odd-numbered subcarriers in the 2M subcarriers includes:

performing, by the sending device, a 2M×2M DFT on a sum of the extended sequence of the first time domain sequence and the extended sequence of the second time domain sequence, and mapping a sequence obtained after the DFT onto the 2M subcarriers; or performing, by the sending device, a 2M×2M DFT on the extended sequence of the first time domain sequence to obtain the third sequence (that is, a sequence obtained by extracting odd-numbered elements of a sequence obtained after the DFT), and mapping the third sequence onto the M odd-numbered subcarriers, and performing a 2M×2M DFT on the extended sequence of the second time domain sequence to obtain the fourth sequence (that is, a sequence obtained by extracting even-numbered elements of a sequence obtained after the DFT), and mapping the fourth sequence onto the M even-numbered subcarriers.

Optionally, if the third sequence carries no information element, and is only a reference signal sequence, before the mapping, by a sending device, a first sequence onto M even-numbered subcarriers in 2M subcarriers, and mapping a second sequence onto M odd-numbered subcarriers in the 2M subcarriers, the method further includes:

obtaining, by the sending device, the second time domain sequence; and extending, by the sending device, the second time domain sequence into a sequence with a length of 2M, where an extension manner of the second time domain sequence is $y(k+M)=y(k)$, where $k=0, 1, 2, 3, \ldots, M-1$.

Further, the mapping, by a sending device, a first sequence onto M even-numbered subcarriers in 2M subcarriers, and mapping a second sequence onto M odd-numbered subcarriers in the 2M subcarriers includes:

mapping, by the sending device, the third sequence onto the M odd-numbered subcarriers, performing a 2M×2M DFT on the extended sequence of the second time domain sequence to obtain the fourth sequence (that is, a sequence obtained by extracting even-numbered elements of a sequence obtained after the DFT), and mapping the fourth sequence onto the M even-numbered subcarriers.

In the third and fourth optional embodiments, a first time domain signal or a second time domain signal has a symmetric or antisymmetric characteristic. Therefore, two corresponding frequency domain signals each are mapped onto only the even-numbered subcarriers or the odd-numbered subcarriers, and two signals sent by the device are frequency-division and orthogonal. It is further required by a transmitted signal that, for the first time domain signal and the second time domain signal that are corresponding to a third signal and a fourth signal, when a complex factor is taken out, one is an I component, and the other is a Q component. Therefore, a peak-to-average ratio characteristic brought together by the two signals is relatively good, and a peak-to-average ratio characteristic brought together by the two signals that are separately obtained after symmetric and antisymmetric extensions is still kept good.

Further, as described above, the two signals in this embodiment of the present disclosure may have multiple combinations. All of these combinations can be applied to the foregoing optional embodiments.

For example, the two signals may be a combination of a reference signal and control information carried by a control channel, may be a combination of a reference signal and data carried by a data channel, or may be a combination of a reference signal and other to-be-transmitted information.

The reference signal may be an uplink reference signal, or may be a downlink reference signal.

Correspondingly, the control information may be uplink control information carried by an uplink control channel, for example, uplink control information carried by a physical uplink control channel (PUCCH), or may be downlink control information carried by a downlink control channel, specifically for example, downlink control information carried by a physical downlink control channel (PDCCH).

The data channel may be an uplink data channel, for example, a physical uplink shared channel (PUSCH), or may be a downlink data channel, for example, a physical downlink shared channel (PDSCH).

In addition, the to-be-transmitted information may be system information carried by a broadcast channel, for example, information carried by a physical broadcast channel (PBCH), or may be a synchronization signal used for synchronization, for example, a primary synchronization signal (PSS) or a secondary synchronization signal (SSS).

The foregoing third sequence corresponds to the reference signal, and the third sequence is a sequence predetermined by the sending device. For example, the third sequence is a sequence obtained by the sending device according to a predetermined rule. The third sequence may be mapped onto the M even-numbered subcarriers. In this case, the third sequence is the first sequence, and corresponds to the first implementation in the foregoing first optional embodiment. Alternatively, the third sequence may be mapped onto the M odd-numbered subcarriers. In this case, the third sequence is the second sequence, and corresponds to the second implementation in the foregoing first optional embodiment. The foregoing fourth sequence corresponds to the data carried by the data channel, the control information carried by the control channel, or the like. The second time domain sequence is a sequence carrying the M first information elements, and the M first information elements may be the control information or the data carried by the data channel.

The sending device may obtain the third sequence according to the predetermined rule, and the third sequence may be an existing reference signal sequence, or another sequence with a low peak-to-average ratio characteristic, for example, a sequence with a constant modulus characteristic.

Optionally, the sending device may use a time domain sequence corresponding to the reference signal sequence to carry the sequence of the M first information elements to obtain the second time domain sequence. Carrying may be: multiplying the time domain sequence corresponding to the reference signal sequence by the sequence of the M first information elements at corresponding locations. Certainly, the second time domain sequence may alternatively be obtained in the following manner: obtaining, by the sending device, a sequence with a low peak-to-average ratio characteristic according to a predefined rule, and multiplying an element at a corresponding location of the sequence by an element at a corresponding location of the M first information elements, that is, using the sequence to modulate the M first information elements to obtain the second time domain sequence.

Optionally, the third sequence may be a sequence carrying to-be-sent information. In this case, the first time domain sequence is a sequence obtained by using a predetermined sequence to carry M second information elements.

Further, in a second implementation, a combination of the two signals may be the following combination:

The M first information elements are a primary synchronization signal, and the M second information elements are a secondary synchronization signal; or the M first information elements are a secondary synchronization signal, and the M second information elements are a primary synchronization signal; or the M first information elements are a first part of a secondary synchronization signal, and the M second information elements are a second part of the secondary synchronization signal; or the M first information elements are a first part of a primary synchronization signal, and the M second information elements are a second part of the primary synchronization signal; or the M first information elements are physical broadcast channel information, and the M second information elements are a primary synchronization signal; or the M first information elements are physical broadcast channel information, and the M second information elements are a secondary synchronization signal.

It should be noted that the foregoing combinations are merely examples, and this embodiment of the present disclosure is not limited thereto.

Figure 4:
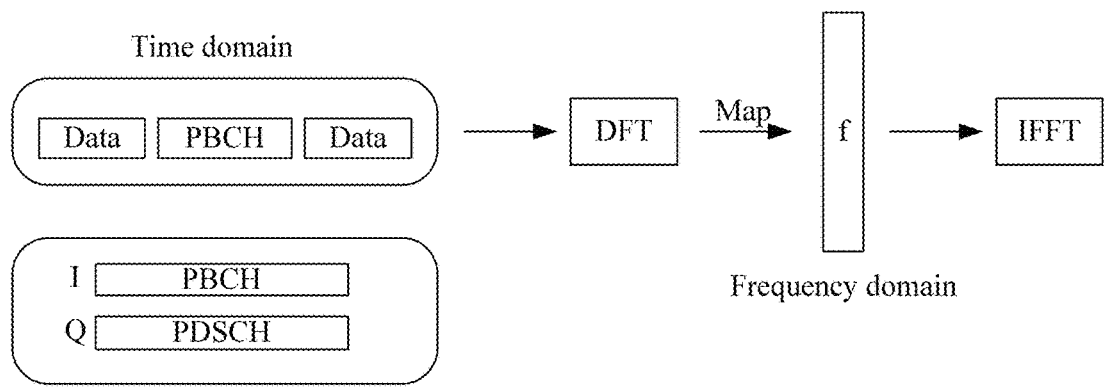
FIG. 4 is a schematic diagram of sending information carried by a broadcast channel and data carried by a downlink data channel in a frequency division multiplexing manner according to an embodiment of the present disclosure.

In an example, frequency division multiplexing shown in FIG. 4 is performed on information carried by a broadcast channel (for example, information carried by a PBCH) and data carried by a downlink data channel (for example, data carried by a PDSCH), the PBCH corresponds to the in-phase component x(t) in the foregoing embodiment, and the PDSCH corresponds to the quadrature component y(t) in the foregoing embodiment. In this way, when the foregoing two channels are simultaneously transmitted, a relatively low peak-to-average ratio can be kept.

In an example, time domain multiplexing may be performed on the PSS and the SSS before DFT mapping, the PSS and the SSS respectively correspond to the in-phase component x(t) and the quadrature component y(t) in the foregoing embodiment, and then the in-phase component x(t) and the quadrature component y(t) are mapped onto a same symbol after the DFT. In this way, when the foregoing two synchronization signals are simultaneously transmitted, a relatively low peak-to-average ratio can be kept.

Figure 5:
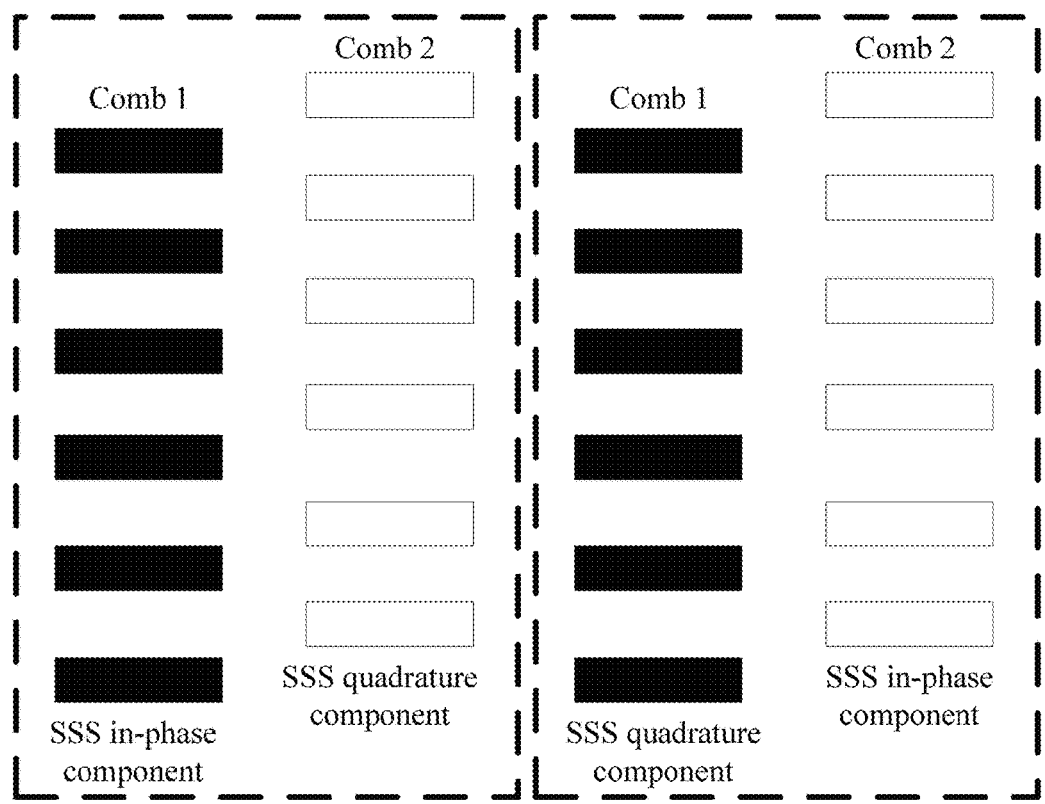
FIG. 5 is a schematic diagram of frequency division multiplexing of a secondary synchronization signal according to an embodiment of the present disclosure.

In an example, the PSS or the SSS may be divided into an in-phase signal and a quadrature signal to perform interleaved transmission. For example, the SSS is divided into two signals that are mutually orthogonal and independent, that is, an in-phase signal and a quadrature signal. The in-phase signal is used to transmit a quadrature component of the SSS, and the quadrature signal is used to transmit an in-phase component of the SSS. The two signals respectively correspond to two combs of a to-be-transmitted time-frequency resource, as shown in FIG. 5. In this example, one signal is divided into an in-phase signal and a quadrature signal and mapped onto the two combs, and according to the different signals on the combs, different information such as cell identification information can be transmitted, or different subframe types can be distinguished. For example, a first signal corresponds to a first subframe type: a frequency division duplex (FDD) subframe type, and a second signal corresponds to a second subframe type: a time division duplex (TDD) subframe type. Alternatively, one signal is divided into an in-phase signal and a quadrature signal and mapped onto a same symbol, so that different transmission moments may be distinguished. For example, the first signal corresponds to a first transmission moment, and the second signal corresponds to a second transmission moment.

Optionally, the predetermined sequence in all the embodiments of the present disclosure, for example, the foregoing sequence used for carrying the M first information elements, or the third sequence in the first implementation, may be a ZC sequence, a cyclically extended sequence of a ZC sequence, a truncated sequence of a ZC sequence, or another sequence with a low peak-to-average ratio/cubic metric. For example, the predetermined sequence may be a time domain sequence or a frequency domain sequence corresponding to a reference signal sequence used in a current LTE system.

Further, if the predetermined sequence is the reference signal sequence in the current LTE system, optionally, the predetermined sequence may be specifically expressed as the following form:

$$t_n = \exp\left(-j2\pi q \cdot \frac{n(n+1)/2 + l \cdot n}{J}\right),$$

$n = 0, 1, 2, \ldots, J-1$, $J$ is an odd number;

and $$t_n = \exp\left(-j2\pi q \cdot \frac{n^2/2 + l \cdot n}{J}\right),$$

$n = 0, 1, 2, \ldots, J-1$, $J$ is an even number.

Herein, J is a length of the ZC sequence. In this embodiment, optionally, J=M; or certainly, J may be not equal to M; and q and J are coprime integers.

Certainly, the predetermined sequence may alternatively be another sequence with a low peak-to-average ratio characteristic.

Further, in all the embodiments of the present disclosure, the 2M subcarriers may be all subcarriers on an entire bandwidth, or may be some subcarriers on an entire bandwidth. Preferably, the 2M subcarriers are 2M contiguous subcarriers or 2M equally spaced subcarriers in a frequency domain. In this way, a remaining subcarrier of the time domain symbol may further carry another signal. That is, the signals carried on the 2M subcarriers and the other signal may be sent on the same time domain symbol in a frequency division multiplexing manner.

For example, a signal, such as control information and a reference signal, sent by a terminal device A and a sounding reference signal (SRS) sent by a terminal device B may be multiplexed onto a physical resource on a same symbol in a frequency division manner. For the terminal device A, a first time domain signal and a second time domain signal that are corresponding to the control information and the reference signal that are multiplexed in the frequency division manner are I/Q orthogonal, and a relatively high peak-to-average ratio may not be caused.

With reference to accompanying drawings, the following describes examples of the several implementations of the foregoing optional embodiments.

Figure 6A:
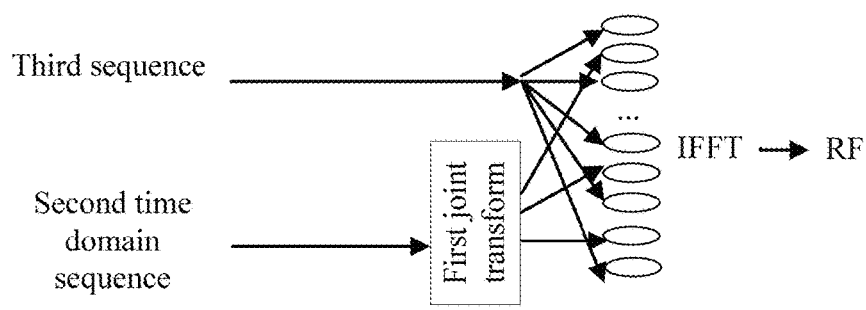
FIG. 6a and FIG. 6b are schematic diagrams of a first example according to an embodiment of the present disclosure.
Figure 6B:
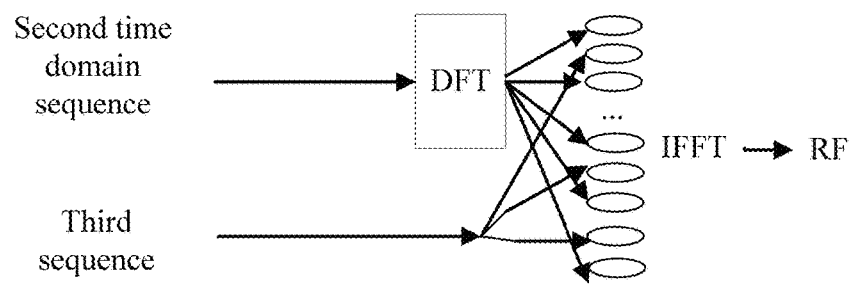

A first manner is shown in FIG. 6a and FIG. 6b.

In FIG. 6a, the first sequence is the third sequence, and the second sequence is the fourth sequence. Before step 301, this embodiment further includes the following steps:

Step 300a1: The sending device obtains the third sequence a(k) and the second time domain sequence.

Step 300a2: The sending device performs a first phase rotation on the second time domain sequence y(t), and performs a DFT on the rotated second time domain sequence to obtain the fourth sequence.

In this way, in step 301, the sending device maps the third sequence onto the M even-numbered subcarriers in the 2M subcarriers, and maps the fourth sequence onto the M odd-numbered subcarriers in the 2M subcarriers.

In FIG. 6b, the first sequence is the fourth sequence, and the second sequence is the third sequence. Before step 301, this embodiment further includes: obtaining, by the sending device, the third sequence a(k) and the second time domain sequence y(t); and performing, by the sending device, a DFT on the second time domain sequence to obtain the fourth sequence.

In this way, in step 301, the sending device maps the third sequence onto the M odd-numbered subcarriers in the 2M subcarriers and maps the fourth sequence onto the M even-numbered subcarriers in the 2M subcarriers.

Further, that the sending device transforms sequences mapped onto the 2M subcarriers to a time domain to generate transmit signals in step 302 may be: performing, by the sending device, an IFFT on the sequences mapped onto the 2M subcarriers to generate the transmit signals. In this embodiment of the present disclosure, the transmit signals all can be generated in this manner, and details are not repeatedly described below.

Figure 7A:
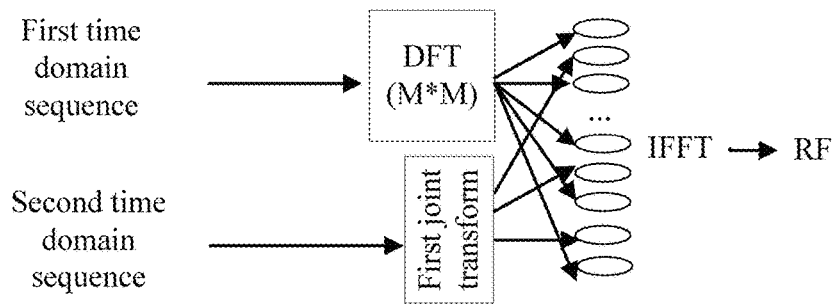
FIG. 7a and FIG. 7b are schematic diagrams of a second example according to an embodiment of the present disclosure.
Figure 7B:
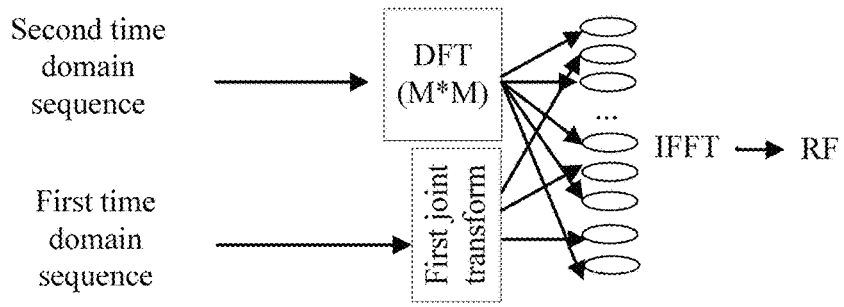

A second manner is shown in FIG. 7a and FIG. 7b.

In FIG. 7a, the first sequence is the third sequence, and the second sequence is the fourth sequence. Before step 301, this embodiment further includes the following steps.

Step 300b1: The sending device obtains the second time domain sequence.

It should be noted that, the third sequence in this embodiment of the present disclosure may be a reference signal sequence, that is, carries no to-be-sent information; or may be a sequence carrying the M second information elements. The same is true for the following embodiments, and details are not repeatedly described below. If the third sequence is the sequence carrying the M second information elements, the first time domain sequence is also obtained in step 300b1.

In addition, in this embodiment of the present disclosure, manners of obtaining the first time domain sequence and the second time domain sequence are not limited either. Reference may be made to the foregoing descriptions. For example, if the first time domain sequence carries no to-be-sent information, the sending device may obtain a predetermined sequence according to a preset rule, that is, obtain the third sequence. If the first time domain sequence carries to-be-sent information, the sending device may obtain a predetermined sequence, and then add the to-be-sent information to the predetermined sequence to obtain the first time domain sequence. The predetermined sequence may be obtained according to the predetermined rule, or may be prestored in the sending device, or may be negotiated between the sending device and the receiving device in advance, or the like. A manner of obtaining the second time domain sequence is similar to that in a case in which the first time domain sequence carries the to-be-sent information, and details are not repeatedly described herein.

Step 300b2: The sending device performs a joint transform of a first linear phase rotation and an M*M DFT transform on the second time domain sequence to obtain the fourth sequence.

It should be noted that, if the first time domain sequence is also obtained in step 300b1, in this step, the sending device further needs to perform a DFT on the first time domain sequence.

Alternatively, the sending device may transform the first time domain sequence and the second time domain sequence at the same time. Therefore, in this step, a sequence of transforming the first time domain sequence and the second time domain sequence is not limited.

In this way, in step 301, the sending device maps the third sequence onto the M even-numbered subcarriers in the 2M subcarriers, and maps the fourth sequence onto the M odd-numbered subcarriers in the 2M subcarriers.

Alternatively, in FIG. 7a, the first sequence is the fourth sequence, and the second sequence is the third sequence. Before step 301, this embodiment further includes the following steps.

Step 300c1: The sending device obtains the second time domain sequence.

A situation of the third sequence is the same as the description in the foregoing embodiment, and details are not repeatedly described herein.

Step 300c2: Perform a DFT on the second time domain sequence to obtain the third sequence.

If the sending device obtains the first time domain sequence, this step further includes: performing, by the sending device, a joint transform of a first linear phase rotation and an M×M DFT transform on the first time domain sequence to obtain the fourth sequence. In this way, in step 301, the sending device maps the third sequence onto the M odd-numbered subcarriers in the 2M subcarriers, and maps the fourth sequence onto the M even-numbered subcarriers in the 2M subcarriers.

If the sending device does not obtain the first time domain sequence but directly generates the third sequence, the sending device directly maps the third sequence onto the M odd-numbered subcarriers. In this way, from the perspective of a time domain, for the third sequence, the first time domain sequence corresponding to the third sequence is a sequence obtained by performing a second joint transform on the third sequence. The second joint transform is equivalent to first performing an IDFT on the third sequence and then performing the second phase rotation. For details, refer to the foregoing description.

The DFT in both the foregoing first manner and second manner is a DFT with a length of M×M.

A third manner is shown in FIG. 8a, FIG. 8b, FIG. 8c, and FIG. 8d, and a DFT in this manner is a DFT with a length of 2M×2M.

Figure 8A:
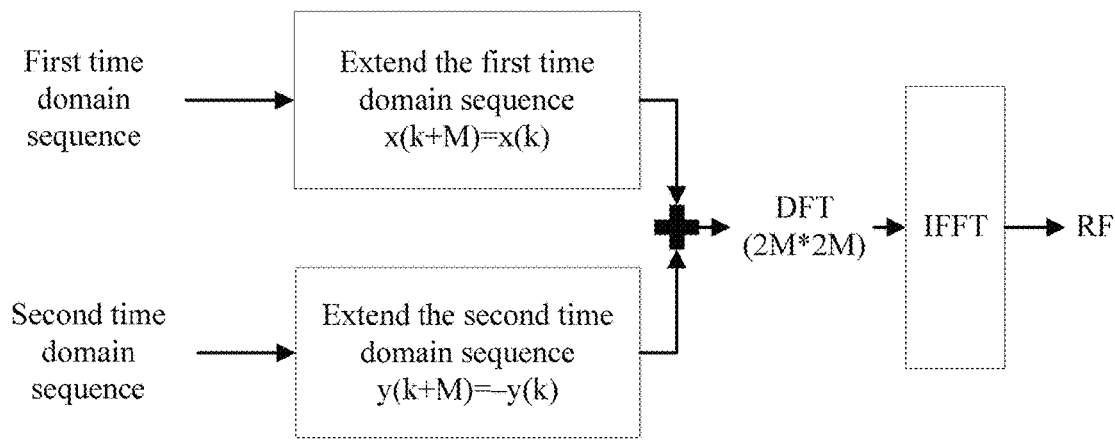
FIG. 8a, FIG. 8b, FIG. 8c, and FIG. 8d are schematic diagrams of a third example according to an embodiment of the present disclosure.

In FIG. 8a, the first sequence is the third sequence, and the second sequence is the fourth sequence. Before step 301, this embodiment further includes the following steps.

Step 300d1: The sending device obtains the first time domain sequence and the second time domain sequence.

Step 300d2: The sending device extends both the first time domain sequence and the second time domain sequence into sequences with lengths of 2M, where an extension manner of the first time domain sequence is $x(k+M)=x(k)$, where $k=0, 1, \ldots, M-1$ and an extension manner of the second time domain sequence is $y(k+M)=-y(k)$, where $k=0, 1, \ldots, M-1$.

Extended sequences may be expressed as follows:

$x(0), x(1), L, x(M-1), x(M)=x(0), x(M+1)=x(1), L, x(2M-1)=x(M-1)$; and $y(0), y(1), L, y(M-1), y(M)=-y(0), y(M+1)=-y(1), L, y(2M-1)=-y(M-1)$ It can be learned that, in the foregoing step 300d2, a symmetric sequence with a period of M is obtained after the first time domain sequence is extended, and an antisymmetric sequence with a period of M is obtained after the second time domain sequence is extended. Therefore, in the foregoing step 300d2, the first time domain sequence repeats once in the period of M, and opposite numbers of M elements of the second time domain sequence repeat once in the period of M.

Step 300d3: The sending device performs a DFT with a length of 2M×2M on a sum of the first time domain sequence and the second time domain sequence, and maps a sequence obtained after the DFT onto the 2M subcarriers.

That is, the DFT with the length of 2M×2M is performed on x(i)+y(i), where i=0, 1, ..., 2M−1. When i=0, 1, ..., M−1, x(i) is the foregoing x(t), and y(i) is the foregoing y(t).

Certainly, in step 300d3, the DFT with the length of 2M×2M may alternatively be separately performed on the extended first time domain sequence and the extended second time domain sequence, and sequences obtained after the DFT are mapped onto the 2M subcarriers.

In the sequences mapped onto the 2M subcarriers in the foregoing manner, the third sequence is still mapped onto the M even-numbered subcarriers, and the fourth sequence is still mapped onto the M odd-numbered subcarriers.

Certainly, if a third time domain sequence does not exist, in this embodiment, only the second time domain sequence needs to be processed. As shown in FIG. 8c, the foregoing extension may be performed on the second time domain sequence, and the third sequence is mapped onto even-numbered subcarriers. Alternatively, as shown in FIG. 8d, the foregoing extension may be performed on the second time domain sequence, and the third sequence is mapped onto odd-numbered subcarriers.

Figure 8B:
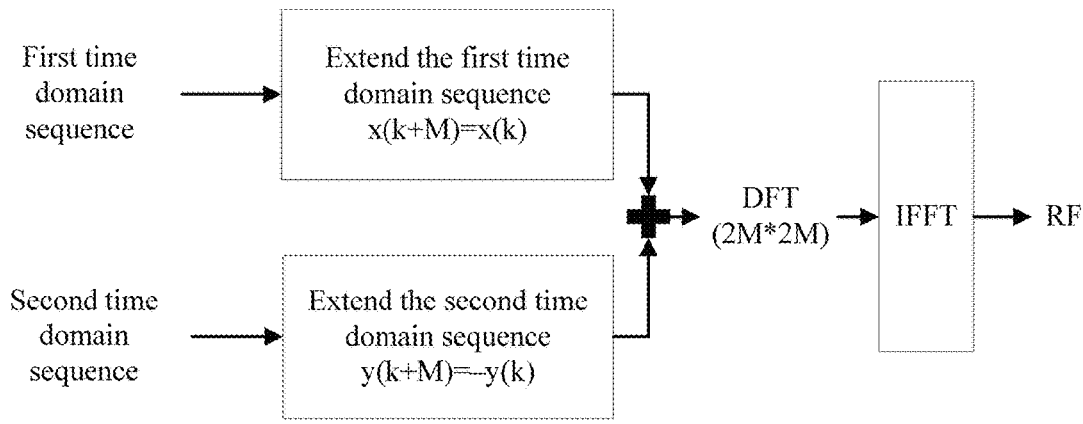
Figure 8C:
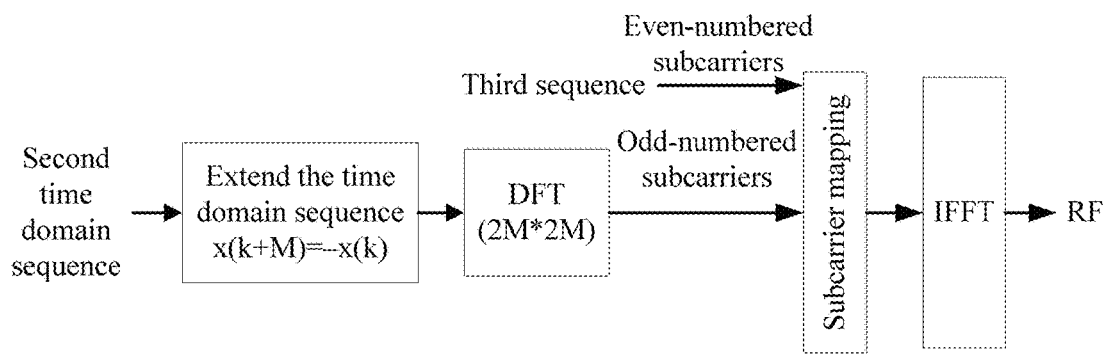
Figure 8D:
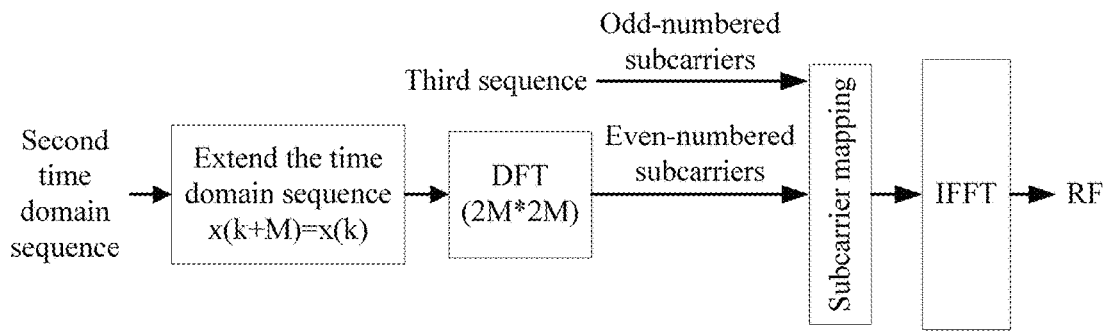

Alternatively, as shown in FIG. 8b, the first sequence is the fourth sequence, and the second sequence is the third sequence. Before step 301, this embodiment further includes step 300e2 and step 300e3.

Step 300e2 is similar to step 300d2, and step 300e3 is similar to step 300d3. A difference is that in this manner, a DFT with a length of 2M×2M is performed on x(i)+y(i), where i=0, 1, ..., 2M−1. When i=0, 1, ..., M−1, x(i) is the foregoing x(t), and y(i) is the foregoing y(t). In sequences mapped onto the 2M subcarriers in the foregoing manner, the third sequence is mapped onto the M odd-numbered subcarriers, and the fourth sequence is mapped onto the M even-numbered subcarriers. Certainly, if a third time domain sequence does not exist, in this embodiment, only the second time domain sequence needs to be processed. As shown in FIG. 8c, the foregoing symmetric extension may be performed on the second time domain sequence, and the third sequence is mapped onto odd-numbered subcarriers. Optionally, the transmit signals include a first signal and a second signal, where a signal corresponding to the M even-numbered subcarriers is the first signal, and a signal corresponding to the M odd-numbered subcarriers is the second signal.

In the transmit signals sent by the sending device, the first signal corresponds to a first power adjustment value, and the second signal corresponds to a second power adjustment value.

It can be learned that, in this embodiment of the present disclosure, the first signal and the second signal may be sent by using different power adjustment values. For example, as described above, P in the first time domain sequence corresponding to the third sequence may be the same as or different from Q in the second time domain sequence.

In this embodiment, signals carried on different carrier sets may correspond to different power adjustment values. Therefore, flexible power setting may be implemented according to a characteristic of a to-be-transmitted signal, to achieve better system performance. To achieve better channel estimation performance, a relatively high power adjustment value may be set for a reference signal, and a relatively low power adjustment value may be set for to-be-transmitted data. Conversely, to achieve better data transmission performance, a relatively high power adjustment value may be set for to-be-transmitted data, and a relatively low power adjustment value may be set for a reference signal.

Figure 9:
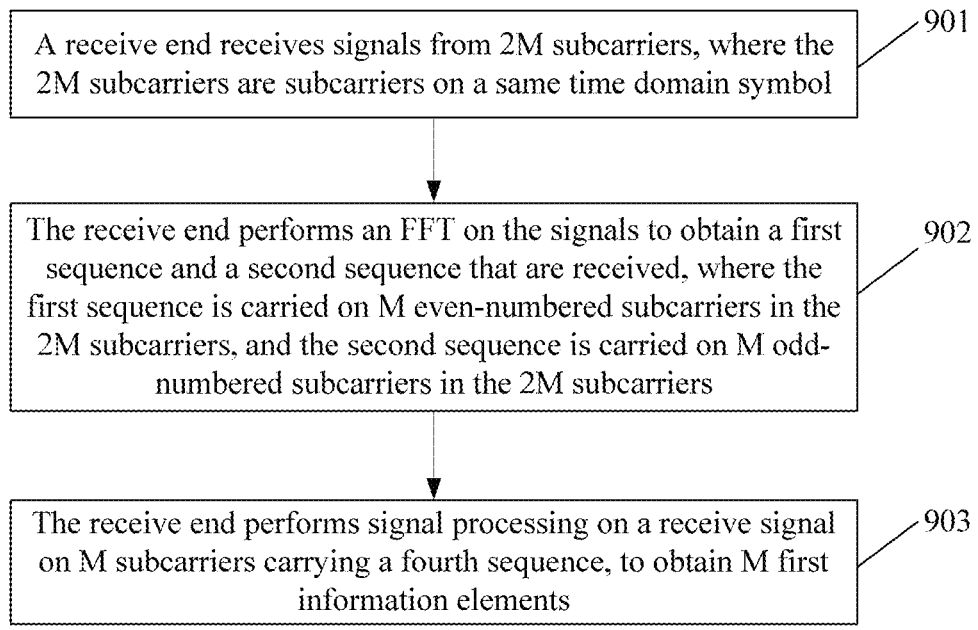
FIG. 9 is a schematic flowchart of a signal receiving method according to an embodiment of the present disclosure.

FIG. 9 is a schematic flowchart of a signal receiving method according to an embodiment of the present disclosure. It should be noted that the method may be used as an independent embodiment, or may be used together with the foregoing signal sending method. In addition, for content that is the same as that in the foregoing embodiments, refer to the descriptions in the foregoing embodiments, and details are not repeatedly described below. This embodiment includes the following steps:

Step 901: A receiving device receives signals from 2M subcarriers, where the 2M subcarriers are subcarriers on a same time domain symbol.

Step 902: The receiving device performs a fast Fourier transform (fast Fourier transformation, FFT) on the signals to obtain a first sequence and a second sequence that are received, where the first sequence is carried on M even-numbered subcarriers in the 2M subcarriers, the second sequence is carried on M odd-numbered subcarriers in the 2M subcarriers, the first sequence is one of the third sequence and the fourth sequence, the second sequence is the other of the third sequence and the fourth sequence, and the fourth sequence is a sequence carrying M first information elements.

Step 903: The receiving device performs signal processing on a receive signal on M subcarriers that carry the fourth sequence, to obtain the M first information elements, where for elements of a first time domain sequence corresponding to the third sequence and a second time domain sequence corresponding to the fourth sequence at a same moment, when a complex factor is taken out, one of the first time domain sequence and the second time domain sequence is an in-phase component, and the other is a quadrature component.

The foregoing I/Q orthogonal characteristic may be used in signal processing of a receiver, and correspondingly, for a specific sending manner, there may be a corresponding receiving manner. For example, at a moment, the second time domain sequence is the quadrature component, the receiver may obtain only the quadrature component of the received second time domain sequence for signal processing, to obtain the M first information elements. Generally, according to a characteristic that when a complex factor is taken out, a transmitted signal is an I component (or a Q component) at a moment, the receiver may take out the complex factor on a receiving party, to obtain the I component (or the Q component) in the signal.

In this embodiment, the performing, by the receiving device, signal processing on a receive signal on M subcarriers that carry the fourth sequence may be: performing signal processing based on a channel estimation result. If the third sequence is a reference signal sequence, the channel estimation result may be a result obtained by performing channel estimation based on the third sequence. If the third sequence is not a reference signal sequence, the channel estimation result may be obtained by performing channel estimation based on another signal, for example, may be obtained by performing channel estimation based on a common reference signal.

In the steps of the receiving device, for same content, refer to the descriptions in the foregoing embodiments, and details are not repeatedly described below.

As described in the foregoing embodiments, the time domain sequences corresponding to the two signals transmitted on the same time domain symbol meet a characteristic of in-phase component and quadrature component transmission, that is, the elements of the time domain sequences corresponding to the two signals transmitted on the same time domain symbol are I/Q orthogonal; therefore, when the two signals are simultaneously transmitted on the same time domain symbol (for example, one symbol), an amplitude value of a signal obtained after the two signals are superposed can keep a low peak-to-average ratio. Therefore, the signal obtained after the two signals are superposed is unlikely to have a high peak-to-average ratio caused by phase randomness, and a peak-to-average ratio increases little. In addition, the two signals meet a frequency-division and orthogonal characteristic, one signal is not on a subcarrier of the other signal, and the two signals can be easily distinguished. Therefore, there is little or no interference between the two signals during reception.

For the foregoing different optional embodiments, the receiving device performs different processing.

Corresponding to the foregoing first optional embodiment:

The first sequence is the third sequence, and the second sequence is the fourth sequence.

The performing, by the receiving device, signal processing on a receive signal on M subcarriers that carry the fourth sequence, to obtain the M first information elements includes:

performing, by the receiving device, a second joint transform on the received fourth sequence carried on the M odd-numbered subcarriers, to obtain the received second time domain sequence, where the second joint transform is a joint transform of an inverse discrete Fourier transform IDFT and a second phase rotation; and demodulating, by the receiving device, the received second time domain sequence to obtain the M first information elements.

The first time domain sequence is a sequence obtained by performing an IDFT on the third sequence. It should be noted that the first time domain sequence is not necessarily obtained by transforming the third sequence, but from the perspective of a time domain, for the third sequence, the third sequence has this characteristic. For example, if the third sequence is an RS sequence, IDFT processing does not need to be performed on the RS sequence. If the third sequence also carries an information element, the receiving device may perform an IDFT on the received third sequence to obtain the received first time domain sequence.

The performing a second joint transform on the received fourth sequence to obtain the received second time domain sequence includes:

performing, by the receiving device, a joint transform of an M×M inverse discrete Fourier transform IDFT and second phase rotations of M elements on the received fourth sequence to obtain the received second time domain sequence.

Phases corresponding to the M elements are respectively $e^{j \times 2t\pi/2M}$, where t=0, 1, ..., M−1. The second joint transform is equivalent to: performing an M×M IDFT, and performing corresponding second phase rotations on M elements of a sequence obtained after the IDFT.

Corresponding to the foregoing second optional embodiment:

The first sequence is the fourth sequence, the second sequence is the third sequence, the first time domain sequence is a sequence obtained by performing a second joint transform on the third sequence, the second joint transform is a joint transform of an M×M inverse discrete Fourier transform IDFT and a second phase rotation, and second phase rotations corresponding to the M elements of the first time domain sequence are respectively $e^{j \times 2t\pi/2M}$, where t=0, 1, ..., M−1.

Likewise, the first time domain sequence is not necessarily obtained by transforming the third sequence, but from the perspective of a time domain, for the third sequence, the third sequence has this characteristic.

The performing, by the receiving device, signal processing on a receive signal on M subcarriers that carry the fourth sequence, to obtain the M first information elements includes:

performing, by the receiving device, an M×M IDFT on the received fourth sequence carried on the M even-numbered subcarriers, to obtain the received second time domain sequence; and demodulating, by the receiving device, the received second time domain sequence to obtain the M first information elements.

Further, if the third sequence carries an information element, after the performing, by the receiving device, an FFT on the signals to obtain a first sequence and a second sequence that are received, the method further includes:

performing, by the receiving device, a joint transform of an M×M IDFT and a second phase rotation on the received second sequence to obtain the received first time domain sequence; and demodulating, by the receiving device, the received first time domain sequence to obtain M second information elements carried by the first time domain sequence.

Corresponding to the foregoing third optional embodiment:

The performing, by the receiving device, signal processing on a receive signal on M subcarriers that carry the fourth sequence, to obtain the M first information elements includes:

performing, by the receiving device, channel equalization on the received fourth sequence;

extending, by the receiving device, the received fourth sequence to be 2M in length by inserting 0s;

performing, by the receiving device, a 2M×2M IDFT on an extended received fourth sequence to obtain the received second time domain sequence, where the second time domain sequence is the first M elements of a sequence obtained after the 2M×2M IDFT or opposite numbers of the last M elements of a sequence obtained after the IDFT, so that the first M elements of the sequence obtained after the IDFT are extracted to obtain the received second time domain sequence; and demodulating, by the receiving device, the received second time domain sequence to obtain the M first information elements.

Further, if the third sequence also carries an information element, after the performing, by the receiving device, a fast Fourier transform (FFT) on the signals to obtain a first sequence and a second sequence that are received, the method further includes:

performing, by the receiving device, channel equalization on the received third sequence;

extending, by the receiving device, the received third sequence into a sequence with a length of 2M by inserting 0s;

performing a 2M×2M IDFT on an extended received third sequence, where the received first time domain sequence is the first M elements or the last M elements of a sequence obtained after the IDFT; and demodulating, by the receiving device, the received first time domain sequence to obtain M second information elements carried by the third sequence.

Corresponding to the foregoing fourth optional embodiment:

The performing, by the receiving device, signal processing on a receive signal on M subcarriers that carry the fourth sequence, to obtain the M first information elements includes:

extending, by the receiving device, the fourth sequence to be 2M in length by inserting 0s;

performing, by the receiving device, a 2M×2M IDFT on an extended fourth sequence to obtain the second time domain sequence, where the second time domain sequence is the first M elements or the last M elements of a sequence obtained after the 2M×2M IDFT; and demodulating, by the receiving device, the second time domain sequence to obtain the M first information elements.

Further, if the third sequence also carries an information element, after the performing, by the receiving device, a fast Fourier transform FFT on the signals to obtain a first sequence and a second sequence that are received, the method further includes:

extending, by the receiving device, the third sequence to be 2M in length by inserting 0s;

performing a 2M×2M IDFT on an extended third sequence, where the first time domain sequence is the first M elements of a sequence obtained after the IDFT or opposite numbers of the last M elements of a sequence obtained after the IDFT; and demodulating, by the receiving device, the first time domain sequence to obtain M second information elements carried by the third sequence.

The following uses a specific application example to further describe the technical solutions in the embodiments of the present disclosure.

In this example, two signals are respectively an uplink reference signal and to-be-transmitted uplink control information. The to-be-transmitted uplink control channel includes M information elements, a sending device is a terminal device, and a receiving device is an access network device. A first sequence is a third sequence, and corresponds to the uplink reference signal, and a second sequence is a fourth sequence, and corresponds to the uplink control information.

In this example, the uplink control information and the uplink reference signal occupy 2M subcarriers on one time domain symbol. The uplink control information occupies M odd-numbered subcarriers (for example, subcarriers numbered 1, 3, 5, 7 . . . ) in the 2M subcarriers, and the uplink reference signal occupies M even-numbered subcarriers (for example, subcarriers numbered 0, 2, 4, 6 . . . ) in the 2M subcarriers. Certainly, the to-be-transmitted uplink control information may occupy the M even-numbered subcarriers in the 2M subcarriers, and the uplink reference signal may occupy the M odd-numbered subcarriers in the 2M subcarriers. In this example, the former manner is used as an example for description.

Elements of the first sequence may be obtained according to a preset rule. For example, the first sequence may be a ZC sequence, a cyclically extended sequence of a ZC sequence, a truncated sequence of a ZC sequence, or a sequence corresponding to a sequence used by a reference signal in an LTE system, for example, a corresponding time domain sequence or frequency domain sequence.

In this example, the first sequence corresponding to the uplink reference signal is predefined. The second time domain sequence corresponding to the second sequence is constructed based on the first sequence, where the second time domain sequence carries modulated phase information of the M information elements. In addition, a time domain signal corresponding to the first sequence is an in-phase component, and a signal corresponding to the second time domain sequence is a quadrature component. For example, a difference between the time domain signal corresponding to the second sequence and the time domain signal corresponding to the first sequence is a positive or negative imaginary unit.

The terminal device obtains the predefined first sequence, and uses a time domain sequence corresponding to the first sequence to carry the M information elements to obtain the second time domain sequence. For example, the first sequence obtained by the terminal device is expressed as $a(k)$, where $k=0, 1, L, M-1$, the first time domain sequence corresponding to the first sequence is expressed as $x(t)$ where $t=0, 1, L, M-1$, and $x(t)$ may be expressed as $x(t)=z(t)\times g(t)$. The second time domain sequence may be expressed as $y(t)z(t)\times Q_t\times h(t)$. $Q_t=j$ or $-j$, and whether $Q_t$ is $j$ or $-j$ depends on a $t^{th}$ information element in the M information elements. For example, if the $t^{th}$ to-be-sent information element is 1, may be j, or if the $t^{th}$ to-be-sent information element is $-1$, $Q_t$ may be $-j$; or if the $t^{th}$ to-be-sent information element is 1, $Q_t$ may be $-j$, or if the $t^{th}$ to-be-sent information element is $-1$, $Q_t$ may be j. In this way, for elements of the first time domain sequence and the second time domain sequence at a same moment, when a common complex factor $z(t)$ is taken out, the first time domain sequence and the second time domain sequence respectively correspond to an in-phase component and a quadrature component in a baseband signal.

After obtaining the first sequence and the second time domain sequence, the terminal device performs a first joint transform on the second time domain sequence. For example, the terminal device may obtain the rotated second time domain sequence after a first linear phase rotation, performs a DFT on the rotated second time domain sequence to obtain the second sequence, then maps the second sequence onto the M odd-numbered subcarriers, and maps the first sequence onto the M even-numbered subcarriers.

First linear phases corresponding to the M elements $y(t)$ of the second time domain sequence are respectively $e^{j\times 2t\pi/2M}$, where $t=0, 1, \ldots, M-1$. Therefore, for the elements of the first time domain sequence and the second time domain sequence at the same moment, when a common complex factor $z(t)$ is taken out, the first time domain sequence and the second time domain sequence respectively correspond to an in-phase component (a real part) and a quadrature component (an imaginary part) in a baseband signal. Whether a correspondence between a time domain signal and a frequency domain signal is an M×M DFT transform or a joint transform of a first linear phase rotation and an M×M DFT transform is determined according to whether a subcarrier onto which the sequence is mapped is an even-numbered subcarrier or an odd-numbered subcarrier, and therefore an I/Q orthogonal characteristic of the first time domain sequence and the second time domain sequence can be ensured. In this way, a peak-to-average ratio (or a cubic metric) brought together by a first time domain signal and a second time domain signal reflects a peak-to-average ratio (or a cubic metric) of an actual signal that is finally transmitted.

Therefore, for the elements of the first time domain sequence and the second time domain sequence at the same moment, after a common complex factor is factored out, the first time domain sequence and the second time domain sequence respectively correspond to an in-phase component and a quadrature component in a baseband signal. That is, for the first time domain sequence x(t) and the second time domain sequence y(t), after a common factor is factored out, one is the in-phase component of the baseband signal, and the other is the quadrature component of the baseband signal. The common factor is a complex factor, and in a special case, the complex factor may be a constant. For example, values of g(t) and h(t) in this example are +1 or −1, so that a corresponding part of the first time domain sequence after the common factor is factored out is the in-phase component, and a corresponding part of the second time domain sequence after the common factor is factored out is the quadrature component.

The sequence x(t) on the M even-numbered subcarriers is a known cyclically extended ZC sequence. Therefore, channel estimation may be performed based on the known sequence, and channel estimation values on all of the M odd-numbered subcarriers are obtained by using a channel interpolation algorithm. Optionally, the interpolation algorithm may be a typical and common algorithm such as linear interpolation or linear extrapolation. Then the modulated phase value is detected based on the foregoing estimated channel values of M subcarriers in a second subcarrier group and the second sequence y(k). In this way, a modulated phase value carried by each of the M odd-numbered subcarriers is obtained.

Figure 10:
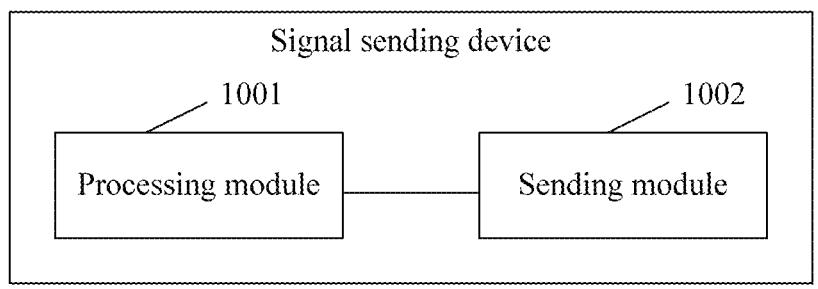
FIG. 10 is a schematic structural diagram of a signal sending device according to an embodiment of the present disclosure.

FIG. 10 is a schematic structural diagram of a signal sending device according to an embodiment of the present disclosure. It should be noted that, the device may be configured to execute the method in the foregoing embodiments. Therefore, for content that is the same as that in the foregoing embodiments, refer to the descriptions in the foregoing embodiments, and details are not repeatedly described below.

The device in this embodiment may include a processing module and a sending module. Certainly, the device may further include a storage module, a receiving module, and the like. The storage module, for example, may store a predetermined sequence, or may store a predetermined rule, or the like.

The processing module is configured to map a first sequence onto M even-numbered subcarriers in 2M subcarriers, and map a second sequence onto M odd-numbered subcarriers in the 2M subcarriers, where the first sequence is one of a third sequence and a fourth sequence, the second sequence is the other of the third sequence and the fourth sequence, the 2M subcarriers are subcarriers on a same time domain symbol, the fourth sequence is a sequence carrying M first information elements, and for elements of a second time domain sequence corresponding to the fourth sequence and a first time domain sequence corresponding to the third sequence at a same moment, when a complex factor is taken out, one of the first time domain sequence and the second time domain sequence is an in-phase component, and the other is a quadrature component.

The processing module is further configured to transform sequences mapped onto the 2M subcarriers to a time domain to generate transmit signals.

The sending module is configured to send the transmit signals generated by the processing module.

As described in the foregoing embodiments, the time domain sequences corresponding to the two signals transmitted on the same time domain symbol meet a characteristic of in-phase component and quadrature component transmission, that is, the time domain sequences corresponding to the two signals transmitted on the same time domain symbol are orthogonal; therefore, when the two signals are simultaneously transmitted on the same time domain symbol (for example, one symbol), an amplitude value of a signal obtained after the two signals are superposed can keep a low peak-to-average ratio. Therefore, the signal obtained after the two signals are superposed is unlikely to have a high peak-to-average ratio caused by phase randomness, and a peak-to-average ratio increases little. In addition, the two signals meet a frequency-division and orthogonal characteristic, one signal is not on a subcarrier of the other signal, and the two signals can be easily distinguished. Therefore, there is little or no interference between the two signals during reception.

Corresponding to the foregoing first optional embodiment:

The first sequence is the third sequence, and the second sequence is the fourth sequence.

The processing module is further configured to: before mapping the second sequence onto the M odd-numbered subcarriers in the 2M subcarriers, perform a first joint transform on the second time domain sequence to obtain the second sequence, where the first joint transform is a joint transform of first linear phase rotations of M elements and a DFT transform.

Further, the first joint transform is a joint transform of the first phase rotations corresponding to the M elements and an M×M discrete Fourier transform DFT, where the first phase rotations corresponding to the M elements are respectively $e^{-j \times 2t\pi/2M}$, where t=0, 1, . . . , M−1.

Further, the first time domain sequence is a sequence obtained by performing an inverse discrete Fourier transform IDFT on the first sequence.

The processing module is configured to perform the first joint transform on the second time domain sequence to obtain the second sequence, in the following manner:
  performing corresponding first phase rotations on M elements of the second time domain sequence respectively, and performing an M×M DFT on the rotated second time domain sequence to obtain the second sequence, where
  the first phase rotations corresponding to the M elements are respectively $e^{-j \times 2t\pi/2M}$, where t=0, 1, . . . , M−1.

Corresponding to the foregoing second optional embodiment:

The first sequence is the fourth sequence, the second sequence is the third sequence, the first time domain sequence is a sequence obtained by performing a second joint transform on the second sequence, the second joint transform is a joint transform of an M×M inverse discrete Fourier transform IDFT and a second phase rotation, and second phase rotations corresponding to the M elements of the first time domain sequence are respectively $e^{j \times 2t\pi/2M}$, where t=0, 1, . . . , M−1.

The processing module is configured to map the first sequence onto the M even-numbered subcarriers in the 2M subcarriers in the following manner: performing a DFT on the second time domain sequence to obtain the first sequence, and mapping the first sequence onto the M even-numbered subcarriers.

Further, before mapping the first sequence onto the M even-numbered subcarriers in the 2M subcarriers, and mapping the second sequence onto the M odd-numbered subcarriers in the 2M subcarriers, the processing module is further configured to:

obtain the first time domain sequence and the second time domain sequence; and perform a first phase rotation on the first time domain sequence, perform a DFT on the rotated first time domain sequence to obtain the third sequence, and perform the DFT on the second time domain sequence to obtain the fourth sequence, where first phase rotations corresponding to the M elements of the first time domain sequence are respectively $e^{j \times 2t\pi/2M}$, where t=0, 1, . . . , M−1.

For a method in which the processing module obtains the first time domain sequence and the second time domain sequence, refer to the foregoing descriptions, and details are not repeatedly described herein.

Corresponding to the foregoing third optional embodiment:

A length of the second time domain sequence is M, the fourth sequence is M odd-numbered elements of a sequence obtained by performing a 2M×2M DFT on an extended sequence of the second time domain sequence, a length of the extended sequence of the second time domain sequence is 2M, and the last M elements of the extended sequence of the second time domain sequence are respectively opposite numbers of M elements of the second time domain sequence.

A length of the first time domain sequence is M, the third sequence is M even-numbered elements of a sequence obtained by performing a 2M×2M DFT on an extended sequence of the first time domain sequence, a length of the extended sequence of the first time domain sequence is 2M, and the last M elements of the extended sequence of the first time domain sequence are respectively the same as M elements of the second time domain sequence.

Further, before mapping the first sequence onto the M even-numbered subcarriers in the 2M subcarriers, and mapping the second sequence onto the M odd-numbered subcarriers in the 2M subcarriers, the processing module is further configured to:

obtain the first time domain sequence x(k) and the second time domain sequence y(k); and extend both the first time domain sequence x(k) and the second time domain sequence y(k) into sequences with lengths of 2M, where an extension manner of the first time domain sequence is x(k+M)=x(k), where k=0, 1, . . . , M−1 and an extension manner of the second time domain sequence is y(k+M)=−y(k), where k=0, 1, . . . , M−1.

The processing module maps the first sequence onto the M even-numbered subcarriers in the 2M subcarriers and maps the second sequence onto the M odd-numbered subcarriers in the 2M subcarriers, in the following manner:

performing a 2M×2M DFT on a sum of the first time domain sequence and the second time domain sequence, and mapping a sequence obtained after the DFT onto the 2M subcarriers; or performing a 2M×2M DFT on the first time domain sequence to obtain the third sequence, and mapping the third sequence onto the M even-numbered subcarriers, and performing a 2M×2M DFT on the second time domain sequence to obtain the fourth sequence, and mapping the fourth sequence onto the M odd-numbered subcarriers.

Corresponding to the foregoing fourth optional embodiment:

A difference from the third embodiment is that extension manners of the first time domain sequence and the second time domain sequence are just opposite to the manners in the third embodiment.

Further, the transmit signals include a first signal and a second signal, where a signal corresponding to the M even-numbered subcarriers is the first signal, and a signal corresponding to the M odd-numbered subcarriers is the second signal.

The sending module sends the transmit signals in the following manner:

sending a product signal of the first signal and a first power adjustment value, and a product signal of the second signal and a second power adjustment value.

Further, the 2M subcarriers may be all subcarriers on an entire bandwidth, or may be some subcarriers on an entire bandwidth.

It should be noted that for an uplink signal, the signal sending device in this embodiment may be a terminal device, or may be a processor in a terminal device. For a downlink signal, the signal sending device may be an access network device, or may be a processor in an access network device.

Figure 11:
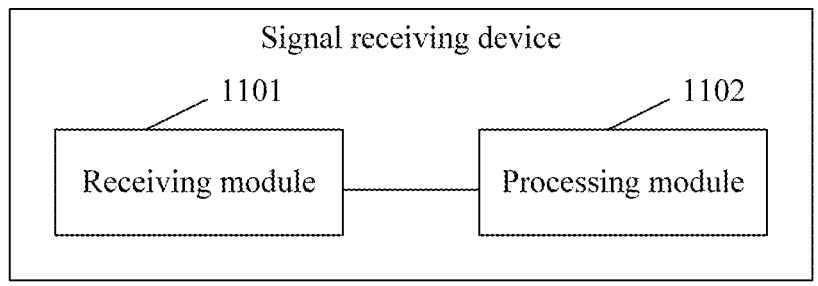
FIG. 11 is a schematic structural diagram of a signal receiving device according to an embodiment of the present disclosure.

FIG. 11 is a schematic structural diagram of a signal receiving device according to an embodiment of the present disclosure. It should be noted that, the device may be configured to execute the method in the foregoing embodiments. Therefore, for content that is the same as that in the foregoing embodiments, refer to the descriptions in the foregoing embodiments, and details are not repeatedly described below.

The device in this embodiment may include a processing module and a receiving module. Certainly, the device may further include a storage module, a sending module, and the like. The storage module, for example, may store a predetermined sequence, or may store a predetermined rule, or the like.

The receiving module is configured to receive signals from 2M subcarriers, where the 2M subcarriers are subcarriers on a same time domain symbol.

The processing module is configured to perform a fast Fourier transform FFT on the signals received by the receiving module, to obtain a first sequence and a second sequence that are received, where the first sequence is carried on M even-numbered subcarriers in the 2M subcarriers, the second sequence is carried on M odd-numbered subcarriers in the 2M subcarriers, the first sequence is one of the third sequence and the fourth sequence, the second sequence is the other of the third sequence and the fourth sequence, and the fourth sequence is a sequence carrying M first information elements.

The processing module is further configured to perform signal processing on a receive signal on M subcarriers that carry the fourth sequence, to obtain the M first information elements, where for elements of a first time domain sequence corresponding to the third sequence and a second time domain sequence corresponding to the fourth sequence at a same moment, when a complex factor is taken out, one of the first time domain sequence and the second time domain sequence is an in-phase component, and the other is a quadrature component.

As described in the foregoing embodiments, the time domain sequences corresponding to the two signals transmitted on the same time domain symbol meet a characteristic of in-phase component and quadrature component transmission, that is, the time domain sequences corresponding to the two signals transmitted on the same time domain symbol are orthogonal; therefore, when the two signals are simultaneously transmitted on the same time domain symbol (for example, one symbol), an amplitude value of a signal obtained after the two signals are superposed can keep a low peak-to-average ratio. Therefore, the signal obtained after the two signals are superposed is unlikely to have a high peak-to-average ratio caused by phase randomness, and a peak-to-average ratio increases little. In addition, the two signals meet a frequency-division and orthogonal characteristic, one signal is not on a subcarrier of the other signal, and the two signals can be easily distinguished. Therefore, there is little or no interference between the two signals during reception.

Corresponding to the foregoing first optional embodiment:

The first sequence is the third sequence, and the second sequence is the fourth sequence.

The processing module is configured to perform the signal processing on the receive signal on the M subcarriers that carry the fourth sequence, to obtain the M first information elements, in the following manner:

performing a second joint transform on the received second sequence carried on the M odd-numbered subcarriers, to obtain the received second time domain sequence, where the second joint transform is a joint transform of an inverse discrete Fourier transform IDFT and a second phase rotation; and demodulating the received second time domain sequence to obtain the M first information elements.

Further, the first time domain sequence is a sequence obtained by performing an IDFT on the first sequence.

The processing module performs the second joint transform on the received second sequence to obtain the received second time domain sequence, in the following manner:

performing an M×M IDFT on the received second sequence, and respectively performing corresponding second phase rotations on M elements of a sequence obtained after the IDFT, to obtain the received second time domain sequence, where the second phase rotations corresponding to the M elements are respectively $e^{j\times 2t\pi/2M}$, where t=0, 1, ..., M−1.

Corresponding to the foregoing second optional embodiment:

The first sequence is the fourth sequence, the second sequence is the third sequence, the first time domain sequence is a sequence obtained by performing a second joint transform on the third sequence, the second joint transform is a joint transform of an M×M IDFT and a second phase rotation, and second phase rotations corresponding to the M elements of the first time domain sequence are respectively $e^{j\times 2t\pi/2M}$, where t=0, 1, ..., M−1.

The processing module performs the signal processing on the receive signal on the M subcarriers that carry the fourth sequence, to obtain the M first information elements, in the following manner:

performing an M×M IDFT on the received first sequence carried on the M even-numbered subcarriers, to obtain the received second time domain sequence; and demodulating the received second time domain sequence to obtain the M first information elements.

Further, after performing the FFT on the signals to obtain the first sequence and the second sequence that are received, the processing module is further configured to:

perform an M×M IDFT on the received second sequence, and respectively perform the second phase rotations on M elements obtained after the IDFT, to obtain the received first time domain sequence (or perform the second joint transform on the received second sequence to obtain the received first time domain sequence); and demodulate the received first time domain sequence to obtain M second information elements carried by the first time domain sequence.

Corresponding to the foregoing third optional embodiment:

That the receiving device performs signal processing on a receive signal on M subcarriers that carry the fourth sequence, to obtain the M first information elements includes:

extending, by the receiving device, the received fourth sequence to be 2M in length by inserting 0s;

performing a 2M×2M IDFT on an extended received fourth sequence, where the received second time domain sequence is the first M elements of a sequence obtained after the IDFT or opposite numbers of the last M elements of a sequence obtained after the IDFT; and demodulating the received second time domain sequence to obtain the M first information elements.

Further, after performing the fast Fourier transform FFT on the signals to obtain the first sequence and the second sequence that are received, the processing module is further configured to:

extend the received third sequence to be 2M in length by inserting 0s;

perform a 2M×2M IDFT on an extended received third sequence, where the received first time domain sequence is the first M elements of a sequence obtained after the IDFT or the last M elements of a sequence obtained after the IDFT; and demodulate the received first time domain sequence to obtain M second information elements carried by the received third sequence.

Corresponding to the foregoing fourth optional embodiment:

A difference from the foregoing third optional embodiment is that extension manners of the first time domain sequence and the second time domain sequence are just opposite to the manners in the third embodiment.

That is, a 2M×2M IDFT is performed on an extended received fourth sequence, where the received second time domain sequence is the first M elements of a sequence obtained after the IDFT or the last M elements of a sequence obtained after the IDFT.

Further, a 2M×2M IDFT is performed on an extended received third sequence, where the received first time domain sequence is the first M elements of a sequence obtained after the IDFT or opposite numbers of the last M elements of a sequence obtained after the IDFT.

It should be noted that for an uplink signal, the signal receiving device in this embodiment may be an access network device, or may be a processor in the access network device. For a downlink signal, the signal receiving device may be a terminal device, or may be a processor in a terminal device.

The embodiments of the present disclosure can be applied to single carrier multiple access technologies, for example, DFT-S-OFDM), Filter-SC-OFDM, or other SC-FDMA, in which control information (uplink or downlink control information) and a reference signal (an uplink reference signal or a downlink reference signal) are simultaneously transmitted on one symbol.

It should be noted that, the processing module in all the embodiments of the present disclosure may be implemented by using at least one processor, the processor herein may be a central processing unit (CPU), or may be another general purpose processor, a digital signal processor (DSP), an application-specific integrated circuit (ASIC), a field programmable gate array (FPGA) or another programmable logic device, a discrete gate or a transistor logical device, a discrete hardware component, or the like. The sending module may be implemented by using a transmitter, or may be implemented by using a transceiver. The receiving module may be implemented by using a receiver, or may be implemented by using a transceiver. In addition, the access network device or user equipment in the embodiments of the present disclosure may further include a part such as a memory. The memory herein may include a read-only memory or a random access memory, and provide an instruction and data for the processor. A part of the memory may further include a non-volatile random access memory. For example, the memory may further store information about a type of a storage device. The processor invokes instruction code in the memory, and controls another module in a network device or the user equipment in the embodiments of the present disclosure to perform the foregoing operations.

It should be noted that "one embodiment" or "an embodiment" mentioned throughout this specification means that specific features, structures, or characteristics related to the embodiments are included in at least one embodiment of the present disclosure. Therefore, "in one embodiment" or "in an embodiment" that appears in various parts of the entire specification is not necessarily a same embodiment. In addition, theses specific features, structures, or characteristics may be combined in any proper manner in one or more embodiments.

In various embodiments of the present disclosure, it should be understood that, sequence numbers of the foregoing processes do not mean execution sequences. The execution sequences of the processes should be determined according to functions and internal logic of the processes, and should not be construed as any limitation to the implementation processes of the embodiments of the present disclosure.

In addition, terms "system" and "network" in this specification may be interchangeable. It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the embodiments provided in this application, it should be understood that, "B corresponding to A" indicates that B is associated with A, and B may be determined according to A. However, it should further be understood that determining B according to A does not mean that B is determined only according to A, but instead B may further be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In the embodiments provided in this application, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A signal sending method, comprising:
    mapping, by a sending device, a first sequence onto M even-numbered subcarriers in 2M subcarriers, and mapping a second sequence onto M odd-numbered subcarriers in the 2M subcarriers, wherein the first sequence is one of a third sequence and a fourth sequence, the second sequence is the other of the third sequence and the fourth sequence, the 2M subcarriers are subcarriers on a same time domain symbol, the fourth sequence is a sequence carrying M first information elements, and for elements of a second time domain sequence corresponding to the fourth sequence and a first time domain sequence corresponding to the third sequence at a same moment, when a complex factor is taken out, one of the first time domain sequence and the second time domain sequence is an in-phase component, and the other is a quadrature component;
    transforming, by the sending device, sequences mapped onto the 2M subcarriers to a time domain to generate transmit signals; and
    sending, by the sending device, the transmit signals.

2. The method according to claim 1, wherein:
the first sequence is the third sequence, and the second sequence is the fourth sequence; and
before mapping the second sequence onto M odd-numbered subcarriers in the 2M subcarriers, the method further comprises:
  performing, by the sending device, a first joint transform on the second time domain sequence to obtain the second sequence, wherein the first joint transform is a joint transform of a first phase rotation and an M×M discrete Fourier transform (DFT).

3. The method according to claim 2, wherein:
the first time domain sequence is a sequence obtained by performing an inverse discrete Fourier transform (IDFT) on the first sequence; and
first phase rotations corresponding to M elements of the first time domain sequence are respectively $e^{-j\times 2t\pi/2M}$, wherein t=0, 1, . . . , M−1.

4. The method according to claim 1, wherein:
a length of the second time domain sequence is M, the fourth sequence is M odd-numbered elements of a sequence obtained by performing a 2M×2M DFT on an extended sequence of the second time domain sequence, a length of the extended sequence of the second time domain sequence is 2M, and the last M elements of the extended sequence of the second time domain sequence are respectively opposite numbers of M elements of the second time domain sequence; and
a length of the first time domain sequence is M, the third sequence is M even-numbered elements of a sequence obtained by performing a 2M×2M DFT on an extended sequence of the first time domain sequence, a length of the extended sequence of the first time domain sequence is 2M, and the last M elements of the extended sequence of the first time domain sequence are respectively the same as M elements of the second time domain sequence.

5. The method according to claim 4, wherein
before mapping, by the sending device, the first sequence onto M even-numbered subcarriers in 2M subcarriers and mapping the second sequence onto M odd-numbered subcarriers in the 2M subcarriers, the method further comprises:
  obtaining, by the sending device, the first time domain sequence x(k) and the second time domain sequence y(k), and
  extending, by the sending device, both the first time domain sequence x(k) and the second time domain sequence y(k) into sequences with lengths of 2M, wherein an extension manner of the first time domain sequence is x(k+M)=x(k), wherein k=0, 1, . . . , M−1, and an extension manner of the second time domain sequence is y(k+M)=−y(k), wherein k=0, 1, . . . , M−1; and
mapping, by the sending device, the first sequence onto M even-numbered subcarriers in 2M subcarriers and mapping the second sequence onto M odd-numbered subcarriers in the 2M subcarriers comprises:
  performing, by the sending device, a 2M×2M DFT on a sum of the first time domain sequence and the second time domain sequence, and mapping a sequence obtained after the DFT onto the 2M subcarriers, or
  performing, by the sending device, a 2M×2M DFT on the first time domain sequence to obtain the third sequence, and mapping the third sequence onto the M even-numbered subcarriers, and performing a 2M×2M DFT on the second time domain sequence to obtain the fourth sequence, and mapping the fourth sequence onto the M odd-numbered subcarriers.

6. A signal receiving method, comprising:
receiving, by a receiving device, signals from 2M subcarriers, wherein the 2M subcarriers are subcarriers on a same time domain symbol;
performing, by the receiving device, a fast Fourier transform (FFT) on the signals to obtain a first sequence and a second sequence, wherein the first sequence is carried on M even-numbered subcarriers in the 2M subcarriers, the second sequence is carried on M odd-numbered subcarriers in the 2M subcarriers, the first sequence is one of the third sequence and the fourth sequence, the second sequence is the other of the third sequence and the fourth sequence, and the fourth sequence is a sequence carrying M first information elements; and
performing, by the receiving device, signal processing on a receive signal on M subcarriers that carry the fourth sequence, to obtain the M first information elements, wherein for elements of a first time domain sequence corresponding to the third sequence and a second time domain sequence corresponding to the fourth sequence at a same moment, when a complex factor is taken out, one of the first time domain sequence and the second time domain sequence is an in-phase component, and the other is a quadrature component.

7. The method according to claim 6, wherein:
the first sequence is the third sequence, and the second sequence is the fourth sequence; and
performing, by the receiving device, signal processing on the receive signal on M subcarriers that carry the fourth sequence, to obtain the M first information elements comprises:
  performing, by the receiving device, a second joint transform on the received fourth sequence carried on the M odd-numbered subcarriers, to obtain the received second time domain sequence, wherein the second joint transform is a joint transform of an inverse discrete Fourier transform (IDFT) and a second phase rotation, and
  demodulating, by the receiving device, the received second time domain sequence to obtain the M first information elements.

8. The method according to claim 7, wherein:
the first time domain sequence is a sequence obtained by performing an IDFT on the first sequence; and
second phase rotations corresponding to the M elements are respectively $e^{-j\times 2t\pi/2M}$, wherein t=0, 1, . . . , M−1.

9. The method according to claim 6, wherein:
performing, by the receiving device, signal processing on the receive signal on M subcarriers that carry the fourth sequence, to obtain the M first information elements comprises:
  extending, by the receiving device, the received fourth sequence to be 2M in length by inserting 0s;
  performing a 2M×2M IDFT on an extended received fourth sequence to obtain the received second time domain sequence, wherein the received second time domain sequence is the first M elements of a sequence obtained after the IDFT or opposite numbers of the last M elements of a sequence obtained after the IDFT; and
  demodulating the received second time domain sequence to obtain the M first information elements.

10. The method according to claim 9, wherein after performing, by the receiving device, the fast Fourier transform (FFT) on the signals to obtain the first sequence and the second sequence that are received, the method further comprises:
- extending, by the receiving device, the received third sequence to be 2M in length by inserting 0s;
- performing a 2M×2M IDFT on an extended received third sequence, wherein the received first time domain sequence is the first M elements of a sequence obtained after the IDFT or the last M elements of a sequence obtained after the IDFT; and
- demodulating, by the receiving device, the received first time domain sequence to obtain M second information elements carried by the third sequence.

11. A signal sending device, comprising:
a processor configured to:
- map a first sequence onto M even-numbered subcarriers in 2M subcarriers, and map a second sequence onto M odd-numbered subcarriers in the 2M subcarriers, wherein the first sequence is one of a third sequence and a fourth sequence, the second sequence is the other of the third sequence and the fourth sequence, the 2M subcarriers are subcarriers on a same time domain symbol, the fourth sequence is a sequence carrying M first information elements, and for elements of a second time domain sequence corresponding to the fourth sequence and a first time domain sequence corresponding to the third sequence at a same moment, when a complex factor is taken out, one of the first time domain sequence and the second time domain sequence is an in-phase component, and the other is a quadrature component, and
- transform sequences mapped onto the 2M subcarriers to a time domain to generate transmit signals; and
a transmitter configured to send the transmit signals generated by the processor.

12. The device according to claim 11, wherein:
the first sequence is the third sequence, and the second sequence is the fourth sequence; and
the processor is further configured to: before mapping the second sequence onto the M odd-numbered subcarriers in the 2M subcarriers, perform a first joint transform on the second time domain sequence to obtain the second sequence, wherein the first joint transform is a joint transform of a first phase rotation and an M×M discrete Fourier transform (DFT).

13. The device according to claim 12, wherein:
the first time domain sequence is a sequence obtained by performing an inverse discrete Fourier transform (IDFT) on the first sequence; and
to perform the first joint transform on the second time domain sequence to obtain the second sequence, the processor is configured to:
- perform corresponding first phase rotations on M elements of the second time domain sequence respectively, and perform an M×M DFT on the rotated second time domain sequence to obtain the second sequence, wherein the first phase rotations corresponding to the M elements are respectively $e^{-j\times 2t\pi/2M}$, wherein t=0, 1, ..., M−1.

14. The device according to claim 11, wherein:
a length of the second time domain sequence is M, the fourth sequence is M odd-numbered elements of a sequence obtained by performing a 2M×2M DFT on an extended sequence of the second time domain sequence, a length of the extended sequence of the second time domain sequence is 2M, and the last M elements of the extended sequence of the second time domain sequence are respectively opposite numbers of M elements of the second time domain sequence; and
a length of the first time domain sequence is M, the third sequence is M even-numbered elements of a sequence obtained by performing a 2M×2M DFT on an extended sequence of the first time domain sequence, a length of the extended sequence of the first time domain sequence is 2M, and the last M elements of the extended sequence of the first time domain sequence are respectively the same as M elements of the second time domain sequence.

15. The device according to claim 14, wherein:
before mapping the first sequence onto the M even-numbered subcarriers in the 2M subcarriers and mapping the second sequence onto the M odd-numbered subcarriers in the 2M subcarriers, the processor is further configured to:
- obtain the first time domain sequence x(k) and the second time domain sequence y(k), and
- extend both the first time domain sequence x(k) and the second time domain sequence y(k) into sequences with lengths of 2M, wherein an extension manner of the first time domain sequence is x(k+M)=x(k), wherein k=0, 1, ..., M−1, and an extension manner of the second time domain sequence is y(k+M)=−y(k), wherein k=0, 1, ..., M−1; and
to map the first sequence onto the M even-numbered subcarriers in the 2M subcarriers and map the second sequence onto the M odd-numbered subcarriers in the 2M subcarriers, the processor is configured to:
- perform a 2M×2M DFT on a sum of the first time domain sequence and the second time domain sequence, and map a sequence obtained after the DFT onto the 2M subcarriers, or
- perform a 2M×2M DFT on the first time domain sequence to obtain the third sequence, and map the third sequence onto the M even-numbered subcarriers, and performing a 2M×2M DFT on the second time domain sequence to obtain the fourth sequence, and mapping the fourth sequence onto the M odd-numbered subcarriers.

16. A signal receiving device, comprising:
a receiver configured to receive signals from 2M subcarriers, wherein the 2M subcarriers are subcarriers on a same time domain symbol; and
a processor configured to:
- perform a fast Fourier transform (FFT) on the signals received by the receiver, to obtain a first sequence and a second sequence that are received, wherein the first sequence is carried on M even-numbered subcarriers in the 2M subcarriers, the second sequence is carried on M odd-numbered subcarriers in the 2M subcarriers, the first sequence is one of the third sequence and the fourth sequence, the second sequence is the other of the third sequence and the fourth sequence, and the fourth sequence is a sequence carrying M first information elements, and
- perform signal processing on a receive signal on M subcarriers that carry the fourth sequence, to obtain the M first information elements, wherein for elements of a first time domain sequence corresponding to the third sequence and a second time domain sequence corresponding to the fourth sequence at a same moment, when a complex factor is taken out, one of the first time domain sequence and the second time domain sequence is an in-phase component, and the other is a quadrature component.

17. The device according to claim 16, wherein:
the first sequence is the third sequence, and the second sequence is the fourth sequence; and
to perform signal processing on the receive signal on the M subcarriers that carry the fourth sequence, to obtain the M first information elements, the processor is configured to:
  perform a second joint transform on the received second sequence carried on the M odd-numbered subcarriers, to obtain the received second time domain sequence, wherein the second joint transform is a joint transform of an inverse discrete Fourier transform (IDFT) and a second phase rotation, and
  demodulate the received second time domain sequence to obtain the M first information elements.

18. The device according to claim 17, wherein:
the first time domain sequence is a sequence obtained by performing an IDFT on the first sequence; and
second phase rotations corresponding to the M elements of the first time domain sequence are respectively $e^{-j \times 2t\pi/2M}$, wherein t=0, 1, ..., M−1.

19. The device according to claim 16, wherein to perform signal processing on a receive signal on M subcarriers that carry the fourth sequence, to obtain the M first information elements, the processor is configured to:
  extend the received fourth sequence to be 2M in length by inserting 0s;
  perform a 2M×2M IDFT on an extended received fourth sequence, wherein the received second time domain sequence is the first M elements of a sequence obtained after the IDFT or opposite numbers of the last M elements of a sequence obtained after the IDFT; and
  demodulate the received second time domain sequence to obtain the first information elements.

20. The device according to claim 19, wherein after performing the fast Fourier transform FFT on the signals to obtain the first sequence and the second sequence that are received, the processor is further configured to:
  extend the received third sequence to be 2M in length by inserting 0s;
  perform a 2M×2M IDFT on an extended received third sequence, wherein the received first time domain sequence is the first M elements of a sequence obtained after the IDFT or the last M elements of a sequence obtained after the IDFT; and
  demodulate the received first time domain sequence to obtain M second information elements carried by the received third sequence.

* * * * *